US008610708B2

(12) United States Patent
Richards

(10) Patent No.: US 8,610,708 B2
(45) Date of Patent: Dec. 17, 2013

(54) METHOD AND APPARATUS FOR THREE-DIMENSIONAL IMAGE RECONSTRUCTION

(75) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 550 days.

(21) Appl. No.: 12/888,166

(22) Filed: Sep. 22, 2010

(65) Prior Publication Data

US 2012/0069019 A1 Mar. 22, 2012

(51) Int. Cl.
*G06T 15/00* (2011.01)
*G06T 17/00* (2006.01)

(52) U.S. Cl.
USPC .......................................... 345/419; 345/420

(58) Field of Classification Search
None
See application file for complete search history.

(56) References Cited

U.S. PATENT DOCUMENTS

| | | | |
|---|---|---|---|
| 8,350,850 B2 * | 1/2013 | Steedly et al. ............... | 345/420 |
| 2009/0110267 A1 | 4/2009 | Zakhor et al. | |
| 2009/0129630 A1 * | 5/2009 | Gloudemans et al. ........ | 382/103 |

OTHER PUBLICATIONS

Bao Guiqiu, Zhou Zhaoying, Xiong Shenshu, Ye Xiongying, Vision-based Flight Parameter Extraction for Micro Air Vehicles, Deparment of Precision Instrument and Mechanics, Tsinghua University, 2003 IEEE, vol. 6-2839, pp. 1-9.*

European Application Serial No. 11174618.6, European Search Report mailed Mar. 23, 2012, 10 pgs.
European Application Serial No. 11174618.6, Office Action mailed May 2, 2012, 2 pgs.
European Application Serial No. 11174618.6, Response filed Oct. 24, 2012 to Office Action mailed May 2, 2012, 13 pgs.
Criminisi, A, et al., "Single View Metrology", *International Journal of Computer Vision*, 40(2), (Jan. 1, 2000), 123-148.
Dusha, D., et al., "Attitude Estimation for a Fixed-Wing Aircraft Using Horizon Detection and Optical Flow", *Digital Image Computing Techniques and Applications, 9th Biennial Conference of the Australian Pattern Recognition Society*, (2007), 485-492.
Guiqui, B., et al., "Vision-based Flight Parameter Extraction Micro Air Vehicles", *IEEE 2003 Aerospace Conference*, (2003), 2839-2847.
Hartley, R., et al., *Multiple View Geometry in Computer Vision*, Cambridge University Press, (2000), 607 pgs.
Hwangbo, M., et al., "Robust Monocular Vision-based Navigation for a Miniature Fixed-Wing Aircraft", Thesis, Robotics Institute, Carnegie Mellon University, Pittsburgh, PA, [online]. Retrieved from the Internet: <http?//www.cs.cmu.edu/myung/thesis_proposal.pdf>, (Sep. 2009), 62 pgs.
Woo, J., et al., "Vision-based UAV Navigation in Mountain Area", *MVA2007 IAPR Conference on Machine Vision Applications*, (May 16-18, 2007, Tokyo, Japan), (May 16, 2007), 236-239.
European Application Serial No. 11174618.6, Response filed Oct. 24, 2012 to Extended Report mailed Mar. 23, 2012, 13 pgs.

* cited by examiner

*Primary Examiner* — Kee M Tung
*Assistant Examiner* — Leon T Cain, III
(74) *Attorney, Agent, or Firm* — Schwegman Lundberg & Woessner, P.A.

(57) ABSTRACT

In accordance with various aspects of the disclosure, a method and apparatus is disclosed for constructing a three-dimensional model of a scene captured as a video stream including obtaining a video stream of a scene by a first camera; locating a horizon with respect to the scene with a second camera; and constructing a three-dimensional model of the scene based upon the obtained video stream and the located horizon.

14 Claims, 16 Drawing Sheets

FILTER IMAGE TO EXTRACT
VERTICAL VECTOR FIELD

FILTER IMAGE TO EXTRACT
HORIZONTAL VECTOR FIELDS

MAP VECTOR FIELDS INTO ABSTRACT LINEAR SPACE

RIDGE LINES DEFINE PARAMETERS OF DIFFERENT
VANISHING POINTS

FILTER IMAGE TO EXTRACT
VERTICAL VECTOR FIELD

RIDGE LINE DEFINES PARAMETERS OF
ZENITH VANISHING POINT

METHOD AND APPARATUS FOR THREE-DIMENSIONAL IMAGE RECONSTRUCTION

BACKGROUND

This disclosure relates generally to the field of image processing and, more specifically, to a method and apparatus for three-dimensional image reconstruction and processing.

One way that three dimensional computer models of a scene can be created is from photographs. This method uses stereo triangulation to measure the distance to various points in the images. The baseline for this triangulation can be produced by two widely separated cameras, or by one camera with relative motion between the camera and the subject. A second method uses perspective geometry to reconstruct the scene in three dimensions if there are strong perspective lines in the image. For example, renaissance paintings, with well defined perspective lines, have been used to create three dimensional computer models of the scene in the painting. This is done by mapping the perspective lines which converge to their vanishing points and interpolating the material in between the perspective lines.

Converting a painting, or a photograph, into a three dimensional model of the represented scene is usually done by using the information inherent in perspective lines to define the geometry of the scene. For example, Renaissance painters often showed receding intersections of walls, panels, floor tiles and roof or ceiling structures. These receding elements converged to well defined vanishing points according to the then newly discovered rules of perspective geometry. In recent times these rules of perspective geometry have been worked backward to develop three dimensional models of some of these Renaissance paintings.

Up until now, extracting the perspective information from an image that is needed to reconstruct three dimensional models from that image has disadvantages. There are two techniques commonly in use. The first is to trace, by hand, the major perspective lines in an image. These tracings are used to define the vanishing points from which a three dimensional model can be constructed. The second method partially automates this process by developing vectors which correspond to the major perspective lines in an image. These vectors are then extended to meet at the vanishing points which define the scene geometry. Unfortunately, existing techniques for measuring these perspective lines are not very accurate and the derived perspective vectors usually do not meet at small points. Rather, the derived lines typically only partially converge and special mathematical methods, such as Singular Value Decomposition (SVD) are needed to "force" convergence to a point.

What is needed, among other things, is an improved method for determining the orientation of a camera (i.e. camera pose) from various characteristics of moving and stationary images and to be able to construct models of three-dimensional images from other images.

SUMMARY

In accordance with various embodiments of this disclosure, a method is disclosed for constructing a three-dimensional model of a scene captured as a video stream. The method includes obtaining a video stream of a scene by a first camera; locating a horizon with respect to the scene with a second camera; and in a processor in communication with a memory having instructions stored therein which, when executed, constructing a three-dimensional model of the scene based upon the obtained video stream and the located horizon.

In accordance with various embodiments of this disclosure, a method is disclosed for mounting two cameras on an aerial vehicle. The method includes arranging a first camera to maintain an essentially horizontal orientation with respect to a horizon to determine a line of the horizon; and arranging a second camera relative to the first camera to image an object at ground level.

In accordance with various embodiments of this disclosure, a computer-implemented method is disclosed for determining a distance from a camera mounted to an aerial vehicle and locations within an image captured by the camera. The method can use a processor in communication with a memory having instructions stored therein which, when executed, perform the method including determining a location of a horizon with respect to a center of the camera, wherein the camera includes a lens with a focal length, the camera arranged at a height above a ground plane and a tilt angle with respect to the horizon; determining a horizon line based on the determined location of the horizon; determining a tilt of the horizon line; determining a location of a ground point in the image; and determining, by a distance determining computer, the distance from the height of the camera, the focal length of the lens of the camera, the tilt angle and the location of the ground point in the image.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
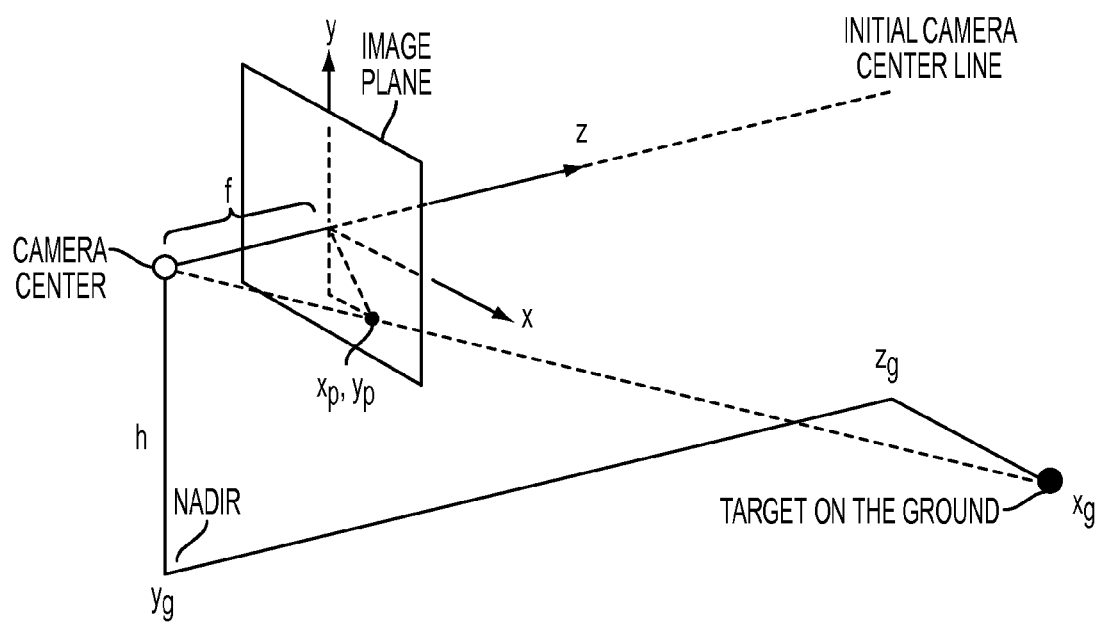
FIG. 1 shows an example of a camera coordinate system (left handed) starting at a standard starting position in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 shows a conventional geometry for image formation including a camera coordinate system (left handed) at a standard starting position. Let us assume that the camera has a focal length, f. The reference location, or origin, of the image is in the center of image at the point where the camera centerline passes through the image plane. Points on the ground are referenced to this camera center. In other words, for this case, the World Coordinate locations of points on the ground are not of concern.

In the cases of interest the camera is viewing a target below on the ground from some altitude, h. The target's coordinates (with respect to the unrotated camera center) are $x_g$, $y_g$, $z_g$. The ray that extends from the camera center to the ground target intercepts the image plane at $x_p$, $y_p$. The ground is below the camera so that the nadir point is located at ($x_g$, $y_g$, $z_g$)=(0, −h, 0). Thus, in this initial camera orientation, the image of the point on the ground will have a negative y value: $y_p$=−h. It can be shown that the image of the target is, before the camera has been rotated out of its starting orientation, at the image coordinates:

$$x_p = \frac{f x_g}{z_g} \text{ and } y_p = \frac{f y_g}{z_g} \quad (1)$$

Suppose the camera moves in the negative z direction. Then the target, regardless of where it is placed in the scene, will recede into the distance, converging ultimately at the horizon along the z-axis. The image path that it follows is given by taking the ratio of the two factors in (1). The equation of the image flow line is therefore, for flight at constant altitude, h:

$$y_p = -\left(\frac{h}{x_g}\right) x_p \quad (2)$$

Figure 2:
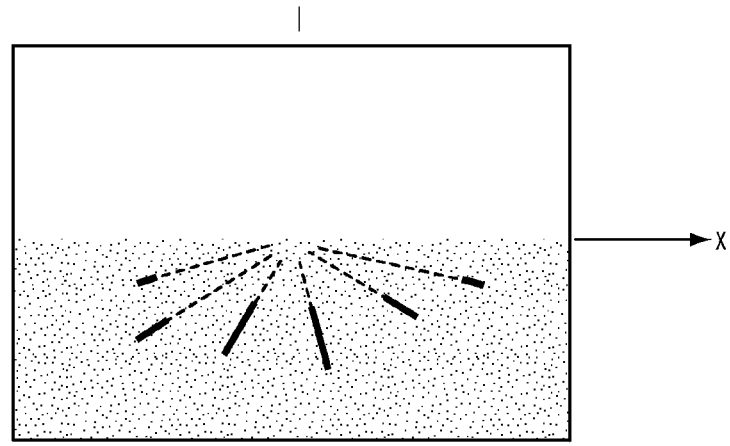
FIG. 2 shows an example of characteristics flow lines due to a camera oriented along the direction of flight in accordance with various aspects of the present disclosure.

For a camera oriented along the direction of flight, the line of the image flow converges to the camera center line, which, initially, has the image coordinates (0,0). FIG. 2 shows these characteristic flow lines. A characteristic of equation (2), as shown in FIG. 2, is that the larger the lateral ground distance, $x_g$, the smaller the slope will be. Negative values for $x_g$ (left of the image center) will have a positive flow line slope. Positive $x_g$'s (right of the image center) will have a negative flow line slope.

The utility of equations (1) can be extended by rotating the camera. For this exposition, the camera is assumed not to be rotated about the camera center line. That is, the camera does not roll around its center line axis. This assumption renders the x-axis to always be parallel to the horizon. This constraint will later be relaxed. The rationale for this assumption is that the camera can be mounted in a vehicle (e.g. an aircraft) which travels in a straight line and therefore does not significantly pitch up and down. However, in the case of operation during severe vehicle motions, the camera may rotate about its line-of-sight axis. This severe case may require image (roll) derotation. The derotation could be determined by looking for obvious vertical lines in the image, or by estimating the horizon angle if the horizon is visible. It is also assumed that, once the camera has been rotated, its orientation remains fixed with respect to the straight line flight path. The camera may be mounted in a gimbal, but once the gimbal angles have been specified, these angles remain constant for the duration of the measurement.

Figure 3:
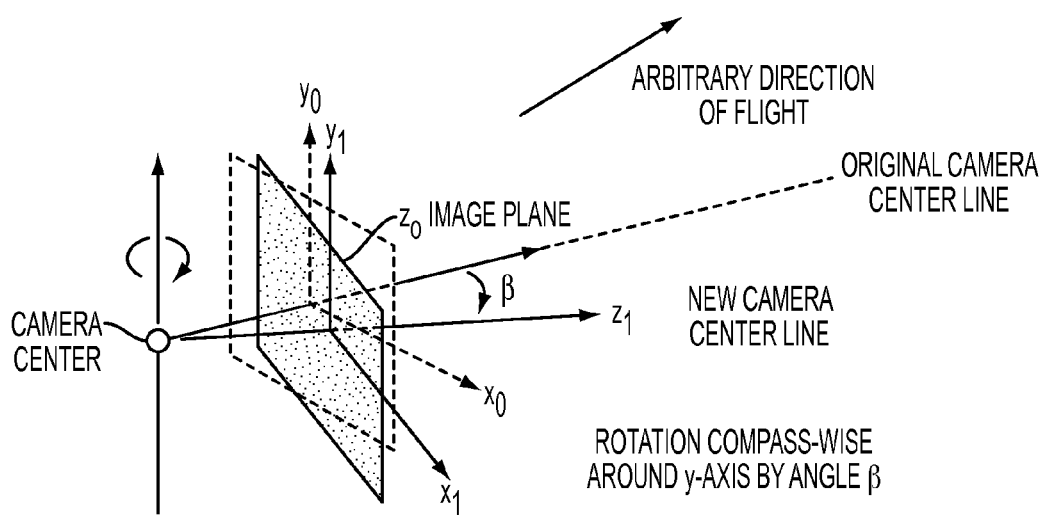
FIG. 3 shows an example coordinate system for camera rotation angles for rotation compass-wise around the vertical y-axis in accordance with various aspects of the present disclosure.
Figure 4:
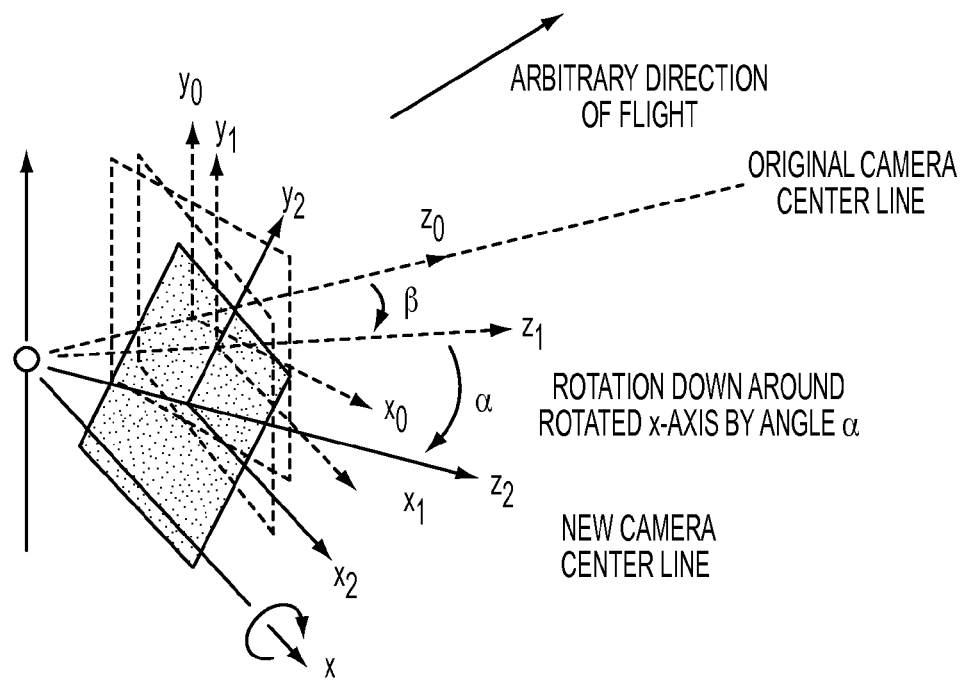
FIG. 4 shows an example coordinate system for camera rotation angles for rotation downwards around the initial x-axis in accordance with various aspects of the present disclosure.

The camera rotation angles are $\alpha$ for rotation downwards around the initial x-axis, followed by $\beta$ for rotation compass wise around the vertical y-axis. These rotations are illustrated by FIGS. 3 and 4. A matrix for compass-wise rotation is defined as B and is:

$$\begin{bmatrix} x_1 \\ y_1 \\ z_1 \end{bmatrix} = B \begin{bmatrix} x_0 \\ y_0 \\ z_0 \end{bmatrix} = \begin{bmatrix} \cos\beta & 0 & -\sin\beta \\ 0 & 1 & 0 \\ \sin\beta & 0 & \cos\beta \end{bmatrix} \begin{bmatrix} x_0 \\ y_0 \\ z_0 \end{bmatrix} \quad (3)$$

Similarly, the matrix for down rotation, denoted by A, is:

$$\begin{bmatrix} x_2 \\ y_2 \\ z_2 \end{bmatrix} = A \begin{bmatrix} x_1 \\ y_1 \\ z_1 \end{bmatrix} = \begin{bmatrix} 1 & 0 & 0 \\ 0 & \cos\alpha & \sin\alpha \\ 0 & -\sin\alpha & \cos\alpha \end{bmatrix} \begin{bmatrix} x_1 \\ y_1 \\ z_1 \end{bmatrix} \quad (4)$$

The matrix for the combined rotations is the ordered product of (3) and (4):

$$\begin{bmatrix} x_2 \\ y_2 \\ z_2 \end{bmatrix} = AB \begin{bmatrix} x_0 \\ y_0 \\ z_0 \end{bmatrix} = \begin{bmatrix} \cos\beta & 0 & -\sin\beta \\ \sin\alpha\sin\beta & \cos\alpha & \sin\alpha\cos\beta \\ \cos\alpha\sin\beta & -\sin\alpha & \cos\alpha\cos\beta \end{bmatrix} \begin{bmatrix} x_0 \\ y_0 \\ z_0 \end{bmatrix} \quad (5)$$

Expressed as separate equations, (5) becomes the equation set:

$$x_2 = x_0 \cos\beta - z_0 \sin\beta \quad (6)$$

$$y_2 = x_0 \sin\alpha \sin\beta + y_0 \cos\alpha + z_0 \sin\alpha \cos\beta \quad (7)$$

$$z_2 = x_0 \cos\alpha \sin\beta - y_0 \sin\alpha + z_0 \cos\alpha \cos\beta \quad (8)$$

Inserting equations (6) through (8) into equations (1), including the camera focal length, and also recognizing that the rotated camera is looking at a ground point, $x_g$, $y_g$, $z_g$, the focal plane (perspective transformed) location of a ground object becomes, for the rotated camera:

$$x_p = \frac{f(x_g \cos\beta - z_g \sin\beta)}{x_g \cos\alpha\sin\beta - y_g \sin\alpha + z_g \cos\alpha\cos\beta} \quad (9)$$

and $$y_p = \frac{f(x_g \sin\alpha\sin\beta + y_g \cos\alpha + z_g \sin\alpha\cos\beta)}{x_g \cos\alpha\sin\beta - y_g \sin\alpha + z_g \cos\alpha\cos\beta} \quad (10)$$

For all objects located on the ground plane (a distance h below the camera), equations (9) and (10) specialize to the form:

$$x_p = \frac{f(x_g \cos\beta - z_g \sin\beta)}{x_g \cos\alpha\sin\beta + h\sin\alpha + z_g \cos\alpha\cos\beta} \quad (11)$$

and $$y_p = \frac{f(x_g \sin\alpha\sin\beta - h\cos\alpha + z_g \sin\alpha\cos\beta)}{x_g \cos\alpha\sin\beta + h\sin\alpha + z_g \cos\alpha\cos\beta} \quad (12)$$

Equations (11) and (12) can be used to get the camera pose for a camera which is moving in a straight line at constant altitude. Moreover, Equations (11) and (12) can also be used to determine the camera pose for non-uniform motion.

There are different ways that the camera can be oriented and moved which will define convenient horizon and nadir vanishing points. As for the horizon vanishing points, a first method is to have the motion be along the z-axis. In this first case, $z_g$ is allowed to go to infinity in equations (11) and (12). In a second method, movement is made parallel to the x-axis. In this second case, $x_g$ is allowed to go to infinity in equations (11) and (12). In either case, the principal vanishing point is along the direction of motion. This is defined as the epipole, or principal vanishing point, between two successive camera positions.

To find the image location of the epipole, in the first case, $z_g$ is allowed to go to infinity in equations (11) and (12). This will produce the image coordinates, $x_{ez}$, $y_{ez}$ of the principal vanishing point. (The notation says that this is the epipole which is found by letting $z_g$ go to infinity: $z_g$ being along the direction of travel.) The result is:

$$x_{ez} = \frac{-f \tan\beta}{\cos\alpha} \quad (13)$$

and, similarly:

$$y_{ez} = f \tan\alpha \quad (14)$$

Equation (14) tells us that if we can find the point of convergence of the flow lines we can, from $y_{ez}$, determine the camera's down angle, $\alpha$. This angle can then be put into equation (13). From the measurement of the direction of the principal vanishing point, $x_{ez}$, and the angle, $\alpha$, the azimuth orientation, $\beta$, of the camera can be obtained. Note that the motion defined epipole (the principal vanishing point) may lie a considerable distance outside the frame of the imagery. An extrapolation to the principal vanishing point may be required. When $\beta = 90°$, $x_{ez}$ goes to infinity. In this case, the camera has rotated to an orientation where $x_{ez}$ is now aligned with the z-axis direction of motion. (We know that the epipole lies in the direction of motion for a fixed camera orientation.) When $\alpha = 90°$, the camera is pointed straight down and Equation (11) becomes:

$$x_p = \frac{f(x_g \cos\beta - z_g \sin\beta)}{h} \quad (15)$$

and equation (12) is:

$$y_p = \frac{f(x_g \sin\beta + z_g \cos\beta)}{h} \quad (16)$$

Equations (15) and (16) tell us that $x_p$ goes to infinity if $x_g$ goes to infinity and $\beta$ is not zero. In this case, the orientation of the camera is such that there is a component of $z_g$ mixed in the x-direction of the image. If $\beta = 0$, then the $x_p$ axis is orthogonal to the $z_g$ axis and it can be expected that $x_p$ will remain finite. A similar analysis shows that $y_p$ remains finite if $\beta = 90°$.

In the second case, $x_g$ is allowed to go to infinity in equations (11) and (12). This is equivalent to moving in the x-direction (positively or negatively). This involves a different orientation of the camera with respect to the direction of travel. In this case, the z-axis is pointed off at right angles to the direction of travel and β=0 represents a direction at right angles to the direction of motion. We have, then:

$$x_{ex} = \frac{f}{\cos\alpha\tan\beta} \qquad (17)$$

and $$y_{ex} = f\tan\alpha \qquad (18)$$

Since Equation (18) is the same as (14), this means the horizon angle is always the same, independent of the azimuth orientation, β, of the camera. Again, once the down angle, α, has been determined, then the camera relative azimuth angle, β, can be determined from (17).

There are two potential pathologies in equation (17). These occur when β=0 or α=90°. We first let β=0 in equation (11). Then, we have:

$$x_p = \frac{fx_g}{h\sin\alpha + z_g\cos\alpha} \qquad (19)$$

Equation (19) show that $x_p$ goes to infinity when $x_g$ goes to infinity. The explanation is simply that we are now traveling in the x-direction so that the epipole (i.e. the principal vanishing point) is aligned with the x-axis. Equation (16) also holds in this case (where α=90°—that is, when the camera is looking straight down). Now we will have $y_p$ going to infinity if β is any angle other than zero.

As for the nadir vanishing points, let $y_h$ is extend to minus infinity (h is infinity) in equations (11) and (12). This gives the vanishing point, $x_{ev}$, $y_{ev}$, in the nadir direction. The nadir vanishing point can be useful in urban scenes because building usually have vertical edges. Thus, by correlating these building edges with the motion derived nadir vanishing point, the estimated camera pose can be refined.

The image coordinates, $x_{ev}$, $y_{ev}$, of the nadir vanishing point are also derived from equations (11) and (12). Thus, $x_p=0$ unless α=0. This is reasonable because the measure of $x_g$ shrinks as we move further away from the ground. In the special case where α=0, we have, from equation (11):

$$x_p = \frac{f(x_g\cos\beta - z_g\sin\beta)}{x_g\sin\beta + z_g\cos\beta} \text{ for } \alpha = 0. \qquad (20)$$

Equation (20) holds for all finite altitudes, h, so that $x_p$ is independent of the altitude. This result is the consequence that the focal plane, in this special case, is oriented parallel to the direction of motion (in the y-direction). However, if h becomes infinite, the image of the target point (at $x_g$, $z_g$) will have, sometime previously, moved off of any finite focal plane so the value of $x_p$ becomes moot. Moreover, $y_p$ can be determined from equation (12) as:

$$y_p = \frac{-f}{\tan\alpha} \qquad (21)$$

Note that $y_p$ is finite if α is not equal to zero. This is because the camera's y-axis is tilted down so that $y_p$ tracks the increase of altitude, h.

If we can find the horizon almost everything that we need to know to build three dimensional models from a video stream can be measured from the imagery. The horizon line is governed by only two parameters, the downward tilt (or dip) angle, α, of the camera and the roll angle, φ, about the camera's line of sight. These angles also determine the location of the nadir point. It often is the case that either the horizon or the nadir, or both, will lie outside the image frame. In which case, some indirect means can be used to determine these angles.

For example, cities can provide an indirect means for estimating the α and φ orientation angles of the camera since buildings usually have vertical edges. The images of these edges are typically sloped in such a way that the edges of multiple buildings will converge to a nadir point. By measuring these slopes, and locations and their divergence, it is possible to discover where the horizon is, even if the true horizon is outside the field of view. The (virtual) angle of the horizon (or the nadir direction) tells us the dip angle, α, of the camera.

The vertical edge of a building will not, in general, appear to be vertical in most images. This is because a perspective rendering of the scene causes vertical edges to converge to a nadir vanishing point. Usually, but not always, this nadir point will lie somewhere below the bottom of the image. By measuring the image slopes of these vertical building edges, we can determine both where the nadir point should be located and we can also determine the location and orientation of the horizon. The horizon can be found even if it, too, is outside the frame of the picture. Let us define the slope, σ, of the vertical edge of a building by:

$$\sigma \equiv \frac{\Delta y}{\Delta x} \qquad (22)$$

A local coordinate system is chosen such that the camera may dip through an angle, α, but is otherwise aligned with the z-axis. Thus, β=0 in equations (11) and (12). In this case, we have cos β=1 and sin β=0. Equations (11) and (12) simplify to become:

$$x_p = \frac{fx_g}{h\sin\alpha + z_g\cos\alpha} \qquad (23)$$

and $$y_p = \frac{f(-h\cos\alpha + z_g\sin\alpha)}{h\sin\alpha + z_g\cos\alpha} \qquad (24)$$

For temporary convenience, a variable, (D), is defined as a stand-in for the denominators in (23) and (24):

$$(D) \equiv (h\sin\alpha + z_g\cos\alpha) \qquad (25)$$

Next, equation (23) is differentiated with respect to the altitude, h:

$$\frac{\partial x_p}{\partial h} = \frac{-fx_g\sin\alpha}{(h\sin\alpha + z_g\cos\alpha)^2} = \frac{-fx_g}{(D)}\frac{\sin\alpha}{(D)} \qquad (26)$$

$$\frac{\partial x_p}{\partial h} = \frac{-x_p\sin\alpha}{(D)}$$

Equation (24) is also differentiated with respect to h:

$$\frac{\partial y_p}{\partial h} = \frac{-f\cos\alpha}{(h\sin\alpha + z_g\cos\alpha)} - \frac{-f(-h\cos\alpha + z_g\sin\alpha)\sin\alpha}{(h\sin\alpha + z_g\cos\alpha)^2} = \quad (27)$$

$$\frac{-f\cos\alpha}{(D)} - \frac{y_p\sin\alpha}{(D)}$$

$$\frac{\partial y_p}{\partial h} = -\frac{(f\cos\alpha + y_p\sin\alpha)}{(D)}$$

Dividing equation (27) by equation (26), we get:

$$\sigma \equiv \frac{\partial y_p}{\partial x_p} = \frac{(f\cos\alpha + y_p\sin\alpha)}{x_p\sin\alpha} = \frac{(f + y_p\tan\alpha)}{x_p\tan\alpha} \quad (28)$$

$$\sigma = \frac{(f + y_p\tan\alpha)}{x_p\tan\alpha}$$

Notice that the slope of a vertical edge depends on where that edge is located, $x_p$, $y_h$, in the image. We can rearrange equation (28) to isolate tan α:

$$\tan\alpha = \frac{f}{\sigma x_p - y_p} \quad (29)$$

Thus, Equation (29) tells us dip angle, α, of the camera below the horizontal. Equations (28) and (29) are derived by a alternative method below.

If those vertical edges which intersect the horizontal midline ($y_p=0$) of the image are examined, we find that, for this special case:

$$\tan\alpha = \frac{f}{\sigma x_p} \quad (30)$$

From equation (28), we see that the slope, σ, goes to infinity (vertical) when $x_p=0$. This is the vertical midline of the camera.

For most camera orientations, the verticals in the scene will, when extended, converge to the nadir vanishing point. For camera orientations where the focal plane x-axis is parallel to the horizon (i.e. no roll about the camera center line), the nadir point will lie along the y-axis. This can be found by rearranging equation (30):

$$x_p = \frac{1}{\sigma}y_p + \frac{f}{\sigma\tan\alpha} \quad (31)$$

It should be noted that $1/\sigma=\Delta x/\Delta y$, which is the expected slope for this case. For the zero roll case, $x_p=0$. Then, by rearranging (31) we get:

$$y_{nadir} = \frac{-f}{\tan\alpha} \quad (32)$$

This is the same as equation (21). The two different techniques for finding the nadir (and the horizon angle) give consistent results.

Figure 5A:
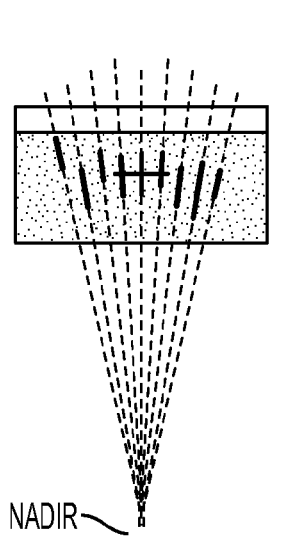
FIGS. 5a and 5b show an example geometry for camera displacement of the apparent vertical from the image center in accordance with various aspects of the present disclosure.
Figure 5B:
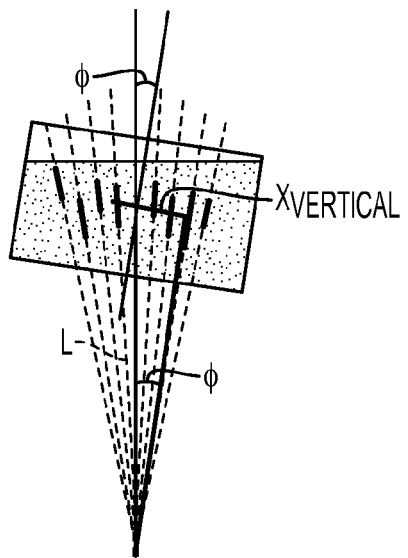

Given the above, it can now be determined if the camera has rolled around the camera center line so that the horizon is tilted with respect to the focal plane x-axis. The method looks at the displacement of the apparent vertical from the image center. FIG. 5 shows the geometry. As the camera rotates through an angle, φ, the horizon tilts in the image and the location of the apparent vertical edge shifts away from the center through a distance $x_{vertical}$. This distance lies along the line $y_p=0$. The apparent image distance from the nadir direction to the center of the image can be defined as L. It should be noted that the nadir direction may be outside the image frame (as could also be the horizon). Also, since the line from the image center to $x_{vertical}$ is perpendicular to the local image vertical, we have:

$$\sin\varphi = \frac{x_{vertical}}{L} \quad (33)$$

But, from equation (32):

$$L = 0 - \left(\frac{-f}{\tan\alpha}\right) = \frac{f}{\tan\alpha} \quad (34)$$

Thus, by combining (33) and (34), the measurement of the camera roll angle can be determined to be:

$$\sin\varphi = \frac{x_{vertical}\tan\alpha}{f} \quad (35)$$

It should be noted that this also gives the orientation of the horizon, even if the horizon is actually outside of the image frame and is therefore not visible. This distance of the horizon from the camera center will remain the same but this distance will no longer be measured along the y-axis. It will now be measured along an axis tilted through an angle, φ, in the opposite direction from the camera roll angle. (The nadir point will also lie along this tilted axis.)

Figure 6:
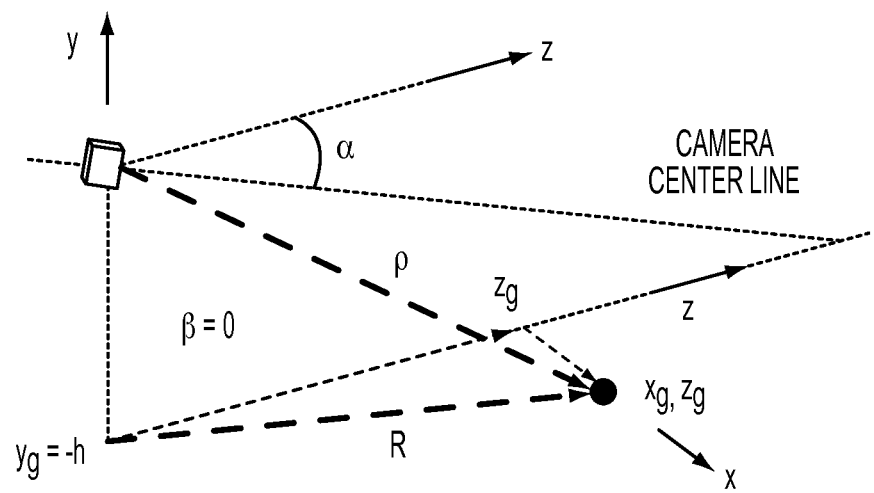
FIG. 6 shows an example geometry showing the range to an object in accordance with various aspects of the present disclosure.

Once the horizon is known—that is, once α and φ are known—the distance to any object on a (ground) plane at a known relative altitude, h, can be determined to an acceptable approximation. In order to determine this distance, the camera focal length, f, needs to be determined. Given the knowledge of f, h, α and φ, the ranges to different features can be determined from a single image. Thus, triangulation using more than one image is not needed. Of course, the accuracy of the range measurement will be a function of the accuracy of our knowledge of α, φ and h. The geometry is illustrated by FIG. 6. The objective is to measure the ground range, R, from immediately below the camera out to the target object, and the slant range, ρ, from the camera to the target object. To do this, both $z_g$ and $x_g$ need to be determined.

As shown in FIG. 6, the camera is assumed to dip an angle, α, below horizontal. It is also assume that the camera roll angle, φ, has been corrected, during the image processing, so that the (virtual) horizon line is now horizontal. The azimuth angle, β, is set to zero so that the camera centerline lies in the y-z plane. This orientation of the local coordinate system simplifies our determination of the ranges. Setting $\beta=0$, we find, from equation (12)

$$y_p = \frac{f(-h\cos\alpha + z_g\sin\alpha)}{h\sin\alpha + z_g\cos\alpha} \quad (36)$$

Rearranging this, we have:

$$z_g = \frac{h(f\cos\alpha + y_p\sin\alpha)}{f\sin\alpha - y_p\cos\alpha} \quad (37)$$

Once h and $\alpha$ are known, the $y_p$ location of the target object gives $z_g$. Similarly, with $\beta=0$, equation (11) becomes:

$$x_p = \frac{fx_g}{h\sin\alpha + z_g\cos\alpha} \quad (38)$$

Rearranging (38) we have:

$$x_g = \frac{x_p(h\sin\alpha + z_g\cos\alpha)}{f} \quad (39)$$

In accordance with some aspects, $z_g$ can be calculated first using equation (37), then this value can be inserted into (39) to calculate $x_g$.

For purposes of interpretation it is useful to insert the formula (37) into (39). This yields:

$$\boxed{x_g = \frac{hx_p}{f\sin\alpha - y_p\cos\alpha}} \quad (40)$$

We see that equations (40) and (37) are both linearly dependent on the relative altitude, h. Thus, h becomes a universal scale factor for reconstructing the three dimensional relationships of the objects within the scene.

Once we have $x_g$ and $z_g$ the desired ranges are given by the usual formulas:

$$R = \sqrt{x_g^2 + z_g^2} \quad (41)$$

and $$\rho = \sqrt{x_g^2 + z_g^2 + h^2} \quad (42)$$

By rotating the camera around its centerline we can easily prove that any straight line in the real world will have a straight line image in a distortion free camera. This result can be used to find the height of a building from its image. Once again we differentiate equation (24) with respect to h. But this time we combine terms in a different way:

$$\frac{\partial y_p}{\partial h} = \frac{-f\cos\alpha}{(h\sin\alpha + z_g\cos\alpha)} - \frac{-f(-h\cos\alpha + z_g\sin\alpha)\sin\alpha}{(h\sin\alpha + z_g\cos\alpha)^2} \quad (43)$$

Multiplying through by the denominator we have:

$$\frac{\partial y_p}{\partial h} = \frac{-f\cos\alpha(h\sin\alpha + z_g\cos\alpha) - f(-h\cos\alpha + z_g\sin\alpha)\sin\alpha}{(h\sin\alpha + z_g\cos\alpha)^2} \quad (44)$$

This simplifies to:

$$\frac{\partial y_p}{\partial h} = \frac{-fz_g}{(h\sin\alpha + z_g\cos\alpha)^2} = \frac{\Delta y_p}{\Delta h} \quad (45)$$

By rearranging equation (45) physical height of a structure can be determined by measuring the height, $\Delta y_p$, of its image:

$$\Delta h = \frac{-(h\sin\alpha + z_g\cos\alpha)^2}{fz_g}\Delta y_p \quad (46)$$

This equation is useful given that we have found the dip angle, $\alpha$, and from this angle the range along the local z-axis (using equation (37)).

Suppose the camera is displaced through some distance, D. Through measurement of the image locations of two different objects on the ground, both D and the relative orientations, $\beta$, of the camera at the ends of D can be determined. In effect, the two ground objects act as a stereo baseline for inverse triangulation of the camera locations and orientations.

Figure 7A:
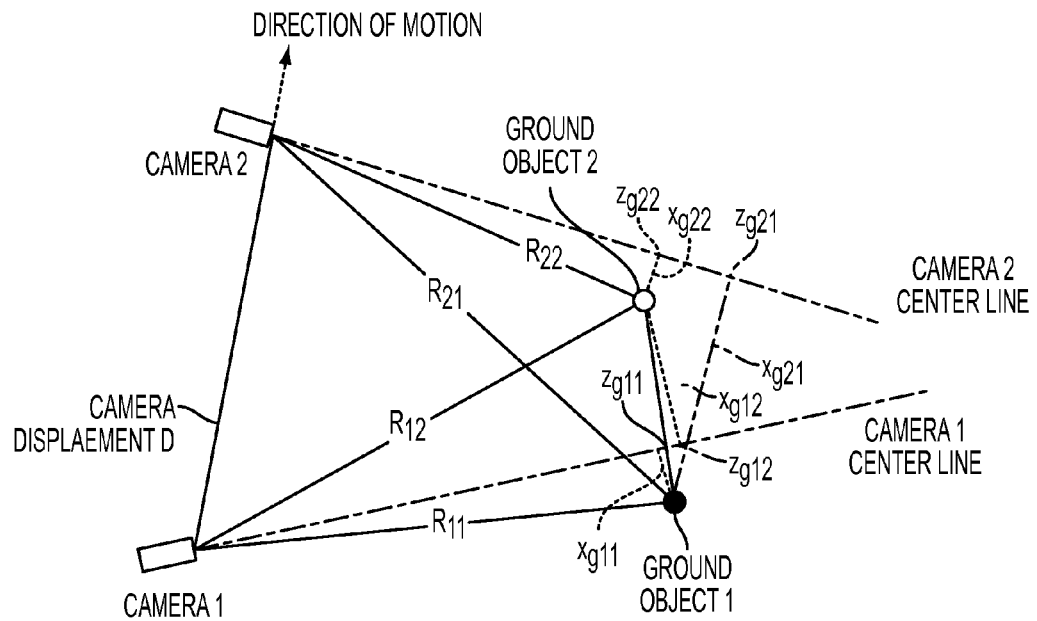
FIGS. 7a and 7b show a plan view of the ground beneath the camera (the camera being at two positions denoted by camera 1 and camera 2) in accordance with various aspects of the present disclosure.
Figure 7B:
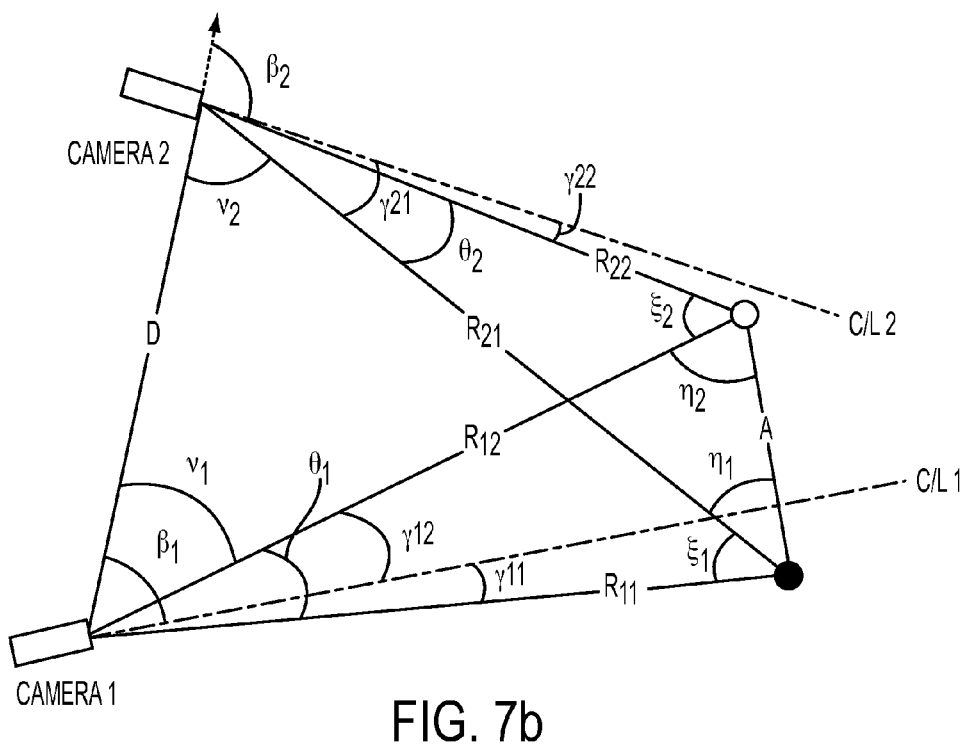
Figure 8:
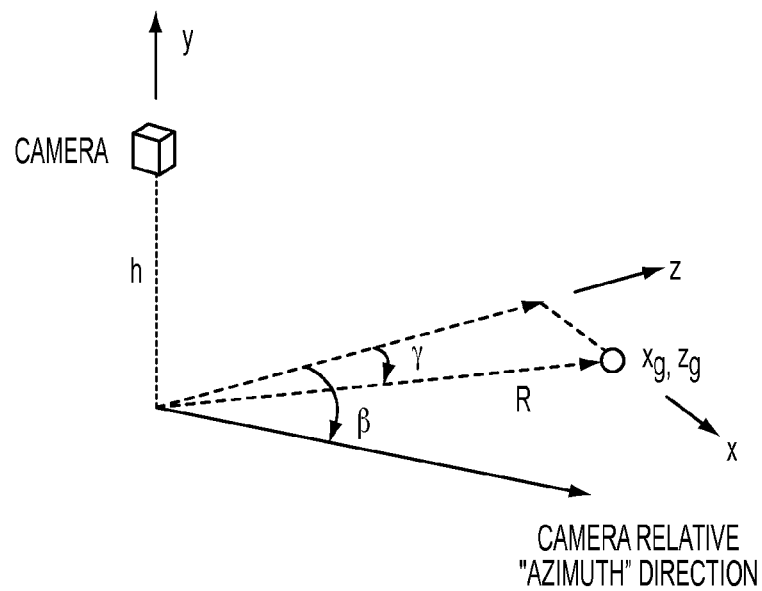
FIG. 8 shows an example geometry defined by the angle γ as measured on the ground immediately below the camera in accordance with various aspects of the present disclosure.

The process to capture D and the camera relative azimuth angles, $\beta$, is now described. FIG. 7 shows the distances angles used by the algorithm and is a plan view of the ground beneath the camera (the camera being at two positions denoted by camera 1 and camera 2). Before beginning the algorithm sequence, two local coordinate systems, one for the camera in the first position (camera 1) and the other for the camera in the second position (camera 2) are established. Each local coordinate system is such that the local z-axis is on the ground and is aligned with the camera centerline. For the sake of simplicity, it is assumed that the camera's focal length, downward tilt angle, $\alpha$, and altitude above the ground plane, h, does not change as we move from the first position to the second. However, the camera may rotate in relative azimuth, $\beta$. In some aspects, the temporarily fixed parameters are allowed to vary, so long as the new parameter values are known.

To start the process, the distances, $R_{11}$, $R_{12}$, from the first camera position to the two ground plane objects are measured. Also, the distances $R_{21}$, $R_{22}$, from the second camera position to the same two ground objects are measured. These measurements require a knowledge of the camera's down tilt angle, $\alpha$, and a correction for any camera rotation, $\phi$, around the camera centerline. In some aspects, the image is (virtually) rotated so that the horizon line is horizontal (i.e. $\phi=0$).

Once $\alpha$ is known and $\phi$ is corrected, for both of the camera positions, equation (37), from above, and equations (39) and (41) are used to determine the distances $R_{11}$, $R_{12}$, $R_{21}$, $R_{22}$ based on the pixel locations, $x_p$ and $y_p$ of the objects in the image:

$$z_g = \frac{h(f\cos\alpha + y_p\sin\alpha)}{f\sin\alpha - y_p\cos\alpha} \quad (37)$$

$$x_g = \frac{x_p(h\sin\alpha + z_g\cos\alpha)}{f} \quad (39)$$

$$R = \sqrt{x_g^2 + z_g^2} \quad (41)$$

The angles, γ, can be determined from:

$$\sin\gamma_{11} = \frac{x_{g11}}{R_{11}} \quad (47)$$

$$\sin\gamma_{12} = \frac{x_{g12}}{R_{12}} \quad (48)$$

$$\sin\gamma_{21} = \frac{x_{g21}}{R_{21}} \quad (49)$$

$$\sin\gamma_{22} = \frac{x_{g22}}{R_{22}} \quad (50)$$

In a similar way, the angles $\gamma_{12}$, $\gamma_{21}$ and $\gamma_{22}$ can be determined. The angles $\theta_1$ and $\theta_2$ can be found from $$\phi_1 = \gamma_{11} + \gamma_{12} \text{ and } \theta_2 = \gamma_{21} + \gamma_{22}. \quad (51)$$

From $R_{11}$ and $R_{12}$ and $\theta_1$, the length A can be found using the standard trigonometric formula:

$$A^2 = R_{11}^2 + R_{12}^2 - 2R_{11}R_{12}\cos\theta_1 \quad (52)$$

We can also find A from:

$$A^2 = R_{21}^2 + R_{22}^2 - 2R_{21}R_{22}\cos\theta_2 \quad (53)$$

In principle these results should be the same. In practice various error sources will make the two determinations of A be somewhat different. By averaging the two results, a more accurate estimate of A may be achieved.

A standard trigonometric relationship for triangles can also be used to find the following angles:

To find $\eta_1$:

$$\sin\eta_1 = \frac{A}{R_{22}}\sin\theta_2 \quad (54)$$

To find $\eta_2$:

$$\sin\eta_2 = \frac{A}{R_{11}}\sin\theta_1 \quad (55)$$

Now that we have $\xi_j$ and $\xi_2$ we can find $\xi_1$ using the same formula:

$$\sin(\xi_1 + \eta_1) = \frac{R_{12}}{A}\sin\theta_1 \quad (56)$$

and $$\sin(\xi_2 + \eta_2) = \frac{R_{21}}{A}\sin\theta_2 \quad (57)$$

From $R_{11}$, $R_{21}$ and $\xi_1$ we find D, using:

$$D^2 = R_{11}^2 + R_{21}^2 - 2R_{11}R_{21}\cos\xi_1 \quad (58)$$

D can be estimated from:

$$D^2 = R_{12}^2 + R_{22}^2 - 2R_{12}R_{22}\cos\xi_2 \quad (59)$$

Given image measurement inaccuracies, it may be difficult to obtain the same value for D from both estimations. In some aspects, an averaged value or a noise weighted average value can be used that may be more accurate than either value by itself.

The angles $v_1$ and $v_2$ can be found through use of the triangle relationship, such that $$\sin v_1 = \frac{R_{22}}{D}\sin\xi_2 \quad (60)$$

and $$\sin v_2 = \frac{R_{11}}{D}\sin\xi_1 \quad (61)$$

It is noted that FIG. 7 shows a fundamental asymmetry in that for the first camera position the angle $\beta_1$ involves a rotation towards the triangle complex. On the other hand, at the second camera position the angle $\beta_2$ denotes a rotation away from the triangle complex. This asymmetry means that the equations for $\beta_1$ and $\beta_2$ are slightly different. The resulting equations are:

Using (48) and (60):

$$\beta_1 = \gamma_{12} + v_1 \quad (62)$$

Using (49) and (61):

$$\beta_2 = 180 - \gamma_{21} - v_2 \quad (63)$$

A "radial vector field" is here defined as an ensemble of isolated vectors, or line segments, which diverge from, or converge to, a common point.

In accordance with various aspects of the present disclosure, there are a number of circumstances where radial vector fields can be extracted from images. For example, a typical urban scene has many features which form fields of vectors which point to scene vanishing points. These might be the edges of buildings, or roadways, or arrays of windows, etc. Between pairs of images, taken from a moving camera, the displacements of various objects in the scene also form a radial field of vectors. In the particular case where the vectors represent the vertical edges of buildings, these edges all extend to the nadir vanishing point. Once the nadir vanishing point is known, it is easy to find the horizon, even if the horizon is outside the field of view of the camera. With knowledge of the horizon, and the height of the camera above the ground plane, the distance to any point on the ground plane can be calculated.

For example, a grid of roads yields edges which extend to vanishing points on the horizon. Alternatively, and complementary, the horizon vanishing points from building base lines and roof lines can be found. These horizon vanishing points provide an alternative method for defining the horizon. In another example, suppose two images of the same scene are taken, but from different locations. The apparent movements of various features between the two images will yield a field of difference vectors which extend to the motion induced vanishing points of the two images. Knowledge of these vanishing points provides a mechanism for determining camera pose (i.e. camera orientation). Once the camera pose has been discovered, it is possible to determine the three dimensional structure of the scene. In some aspects of the present disclosure, a Least Squares technique can be used to find these vanishing points from radial vector fields.

Figure 9:
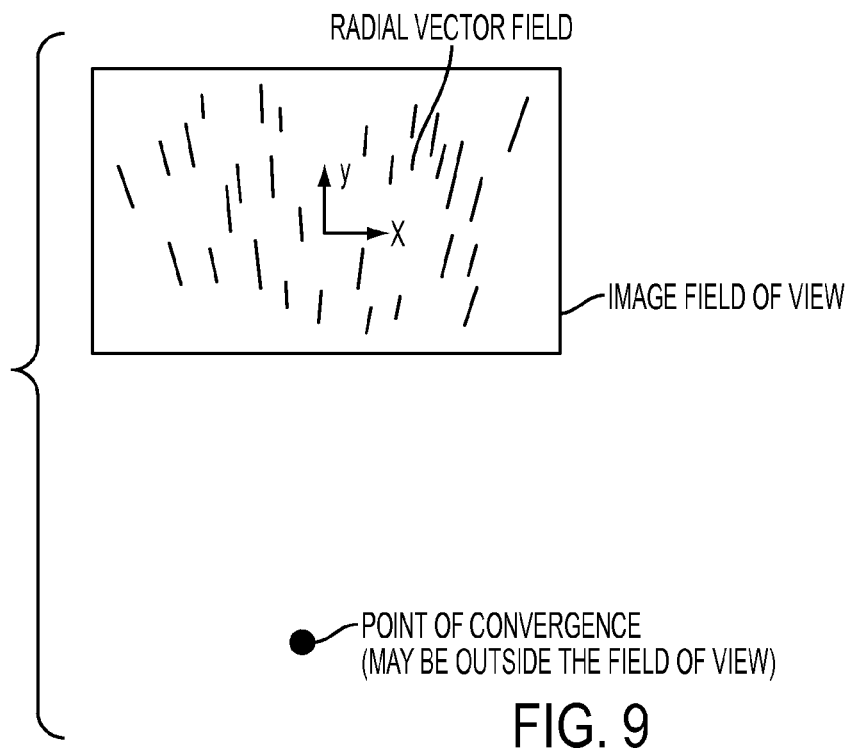
FIG. 9 shows an example geometry of a radial vector field in accordance with various aspects of the present disclosure.
Figure 10:
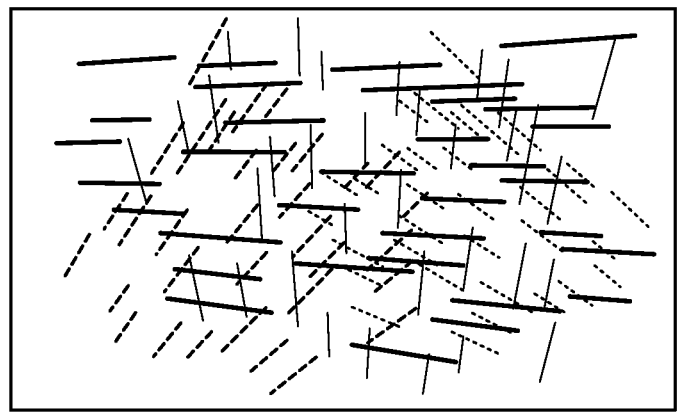
FIG. 10 shows an example geometry of several vector fields converging towards different vanishing points in accordance with various aspects of the present disclosure.

A number of different image phenomena produce vector fields that radiate from a single point. We have defined vector fields of this type as radial vector fields. Each of these radial vector fields have an appearance which is typically represented by FIG. 9. In practice, a single image (or a pair of images) may have several such vector fields—each converging towards a different vanishing point. In combination these radial vector fields may define both the natural geometry of the scene and the motion of the camera, as shown by FIG. 10. In the discussion below, the various parameters which control the structures of these various radial vector fields are discussed. That is, the apparent locations of the vanishing points of each of these vector fields is determined. From these vanishing points, information about the structure of the scene can be gained.

Figure 11:
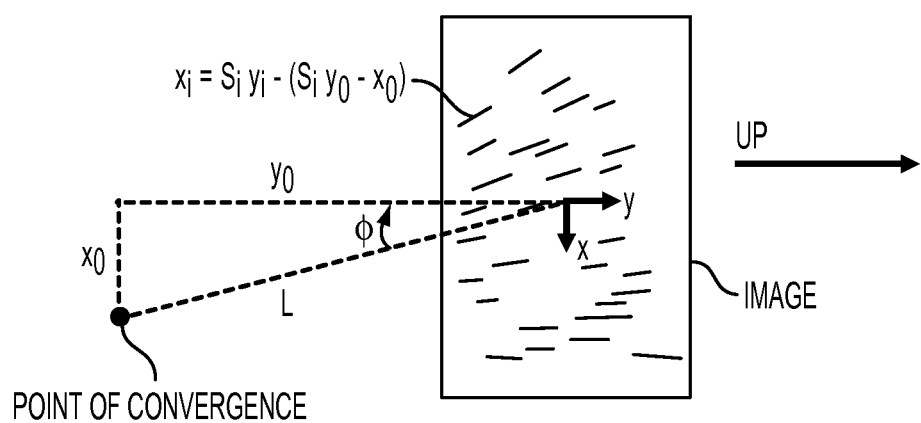
FIG. 11 shows an example geometry of the vertical vector field in accordance with various aspects of the present disclosure.

First, a formal description of the vertical vector field is presented. As a standard case, the vector field that corresponds to the vertical edges of buildings is considered. In most cases this field will look similar to what is shown in FIG. 9. If the slopes of these vectors is represented by $\sigma = \Delta y / \Delta x$, then the tangent of these slopes will be very large, or even infinite because $\Delta x$ is small. Thus, for this case, the image is conceptually reoriented by 90° and define a given slope by the reciprocal of a: $1/\sigma = S = \Delta x / \Delta y$. In this way, the possibility of singularities is eliminated. The result is shown in FIG. 11. As FIG. 11 shows, the center of the image coordinate system is at the center of the image. The axes of the coordinate system are labeled according to regular image convention (up is to the right in this illustration). The point of convergence (the vanishing point) is displaced from the y-axis through an angle, $\phi$. The location of this point is $x_0$, $y_0$ (in the original image coordinate system). It is assumed that the convergence of the vector field is governed by an angle, $\alpha$, which is related to the camera's orientation.

In the special case where the vector field represents vertical edges of buildings, the angle, $\alpha$, will be the dip angle of the camera centerline below the horizon and the angle, $\phi$, is the roll angle of the camera around the center line. Together these angles define the location and orientation of the horizon, even if the horizon is outside the field of view of the camera. As is discussed above, L is given by equation 34:

$$L = \frac{f}{\tan \alpha} \quad (34)$$

where, f, is the focal length of the camera and L is given by:

$$L = \sqrt{x_0^2 + y_0^2} \quad (64)$$

Thus, for the vertical vector field, we have, from equations (34) and (64), the camera downward dip angle:

$$\tan \alpha = \frac{f}{\sqrt{x_0^2 + y_0^2}} \quad (65)$$

From FIG. 11 we also see that the camera roll angle is given by:

$$\sin \varphi = \frac{x_0}{\sqrt{x_0^2 + y_0^2}} \quad (66)$$

Thus, once $x_0$, $y_0$ are found, we will, using equations (65) and (66), have also found $\alpha$ and $\phi$. The ultimate objective will be to find the equivalent of $\alpha$ and $\phi$ for each vector field.

The Vector Field Equations will now be discussed. For each vector in the field, indexed by i, a linear equation of the form can be written as:

$$x_i = S_i(y_i - y_0) + x_0$$

$$x_i = S_i y_i - (S_i y_0 - x_0) \quad (67)$$

Equation (67) can be rearranged and the following substitution can be extracted:

$$A_i = x_i - S_i y_i \quad (68)$$

Then, with this substitution, equation (67) can be written:

$$0 = A_i + S_i y_0 - x_0 \quad (69)$$

Under ideal circumstances the values for combination variable, $A_i$, and the slope, $S_i$, will be such that equation (69) always yields zero for each contributing vector. That is, all the contributing vectors point to the location $x_0$, $y_0$. In reality, though, there will be imperfections in the measurements so these vectors will not all point to the true $x_0$, $y_0$. However, if a least squares technique is used, then a good estimate of $x_0$, $y_0$ can be determined. By using the entire field of vectors to estimate, $x_0$, $y_0$, more of such vectors can be used to improve the estimate. Furthermore, it does not matter where in the image these vectors are located, or how long they are (unless they are weighted by length), they will all contribute equally to the final estimate.

The Least Squares Estimate of the Radial Vector Field is now discussed. Suppose an error function, E, is constructed for the vector field, such that E can be written as:

$$E = \sum_i (A_i + S_i y_0 - x_0)^2 \quad (70)$$

where:

$$A_i = x_i - S_i y_i$$

for each vector in a particular vector field. The summation is over all these vectors.

E is differentiated with respect to $x_0$ to yield:

$$\frac{dE}{dx_0} = 0 = \sum_i A_i + y_0 \sum_i S_i - n x_0 \quad (71)$$

And, E is differentiated with respect to $y_0$ to yield:

$$\frac{dE}{dy_0} = 0 = \sum_i A_i S_i + y_0 \sum_i S_i^2 - x_0 \sum_i S_i \quad (72)$$

Equations (71) and (72) are rearranged to produce the paired equations:

$$\sum_i A_i = n x_0 - y_0 \sum_i S_i \quad (73)$$

and $$\sum_i A_i S_i = x_0 \sum_i S_i - y_0 \sum_i S_i^2 \quad (74)$$

Equations (73) and (74) can be rewritten in matrix form:

$$\begin{bmatrix} \sum_i A_i \\ \sum_i A_i S_i \end{bmatrix} = \begin{bmatrix} n & -\sum_i S_i \\ \sum_i S_i & -\sum_i S_i^2 \end{bmatrix} \begin{bmatrix} x_0 \\ y_0 \end{bmatrix} \quad (75)$$

The formal solution to this is found by left multiplying both sides by an inverse matrix:

$$\begin{bmatrix} n & -\sum_i S_i \\ \sum_i S_i & -\sum_i S_i^2 \end{bmatrix}^{-1} \begin{bmatrix} \sum_i A_i \\ \sum_i A_i S_i \end{bmatrix} = \begin{bmatrix} x_0 \\ y_0 \end{bmatrix} \quad (76)$$

The inverse matrix is:

$$\begin{bmatrix} n & -\sum_i S_i \\ \sum_i S_i & -\sum_i S_i^2 \end{bmatrix}^{-1} = \frac{1}{\text{Det}} \begin{bmatrix} -\sum_i S_i^2 & \sum_i S_i \\ -\sum_i S_i & n \end{bmatrix} \quad (77)$$

Where the determinant is:

$$\text{Det} = \left(\sum_i S_i\right)^2 - n \sum_i S_i^2 \quad (78)$$

Equations (77) and (78), together with (76) yields the matrix equation:

$$\begin{bmatrix} x_0 \\ y_0 \end{bmatrix} = \frac{1}{\text{Det}} \begin{bmatrix} -\sum_i S_i^2 & \sum_i S_i \\ -\sum_i S_i & n \end{bmatrix} \begin{bmatrix} \sum_i A_i \\ \sum_i A_i S_i \end{bmatrix} \quad (79)$$

Multiplying terms, we get the result:

$$x_0 = \frac{\sum_i S_i \sum_i A_i S_i - \sum_i S_i^2 \sum_i A_i}{\left(\sum_i S_i\right)^2 - n \sum_i S_i^2} \quad (80)$$

and $$y_0 = \frac{n \sum_i A_i S_i - \sum_i S_i \sum_i A_i}{\left(\sum_i S_i\right)^2 - n \sum_i S_i^2} \quad (81)$$

Equations (80) and (81) provide the coordinates of the vanishing point, and therefore the essential description, of the (vertically oriented) vector field. It is recognized that the computation burden grows only linearly with the number of vectors in the field.

Figure 12:
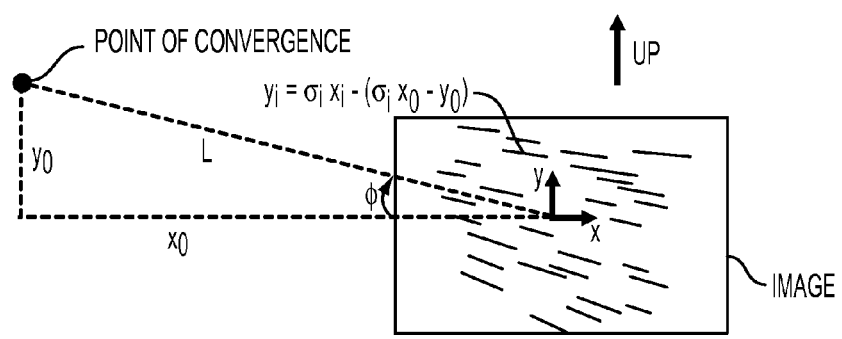
FIG. 12 shows an example geometry of the horizontal vector field in accordance with various aspects of the present disclosure.

Next, a formal description of a horizontal vector field is presented. A typical horizontal vector field is shown in FIG. 12. In this case, the slope of a given vector is defined by $\sigma_i = \Delta y_i / \Delta x_i$. The image coordinate system, however, remains the same as for the vertical vector field.

The error function for this vector field is therefore:

$$E = \sum_i (a_i + \sigma_i x_0 - y_0)^2 \quad (82)$$

where:

$$a_i \equiv y_i - \sigma_i x_i \quad (83)$$

Differentiating the error function with respect to $x_0$ and $y_0$, and solving the resulting equations, in the same way as before, we end up with the matrix equation:

$$\begin{bmatrix} \sum_i a_i \sigma_i \\ \sum_i a_i \end{bmatrix} = \begin{bmatrix} -\sum_i \sigma_i^2 & \sum_i \sigma_i \\ -\sum_i \sigma_i & n \end{bmatrix} \begin{bmatrix} x_0 \\ y_0 \end{bmatrix} \quad (84)$$

The formal solution of this is:

$$\begin{bmatrix} -\sum_i \sigma_i^2 & \sum_i \sigma_i \\ -\sum_i \sigma_i & n \end{bmatrix}^{-1} \begin{bmatrix} \sum_i a_i \sigma_i \\ \sum_i a_i \end{bmatrix} = \begin{bmatrix} x_0 \\ y_0 \end{bmatrix} \quad (85)$$

Having inverted the matrix, we find that:

$$\begin{bmatrix} x_0 \\ y_0 \end{bmatrix} = \frac{1}{\text{Det}} \begin{bmatrix} n & -\sum_i \sigma_i \\ \sum_i \sigma_i & -\sum_i \sigma_i^2 \end{bmatrix} \begin{bmatrix} \sum_i a_i \sigma_i \\ \sum_i a_i \end{bmatrix} \quad (86)$$

where the determinant is, similar to before:

$$\text{Det} = \left(\sum_i \sigma_i\right)^2 - n \sum_i \sigma_i^2 \quad (87)$$

Multiplying equation (86) through, and using equation (87), we arrive at:

$$x_0 = \frac{n \sum_i a_i \sigma_i - \sum_i \sigma_i \sum_i a_i}{\left(\sum_i \sigma_i\right)^2 - n \sum_i \sigma_i^2} \quad (88)$$

and $$y_0 = \frac{\sum_i \sigma_i \sum_i A_i \sigma_i - \sum_i \sigma_i^2 \sum_i A_i}{\left(\sum_i \sigma_i\right)^2 - n \sum_i \sigma_i^2} \quad (89)$$

Notice the symmetry between equations (88) and (89) and equations (80) and (81). Between these two sets of equations, $S_i$ is interchanged with $\sigma_i$ and $x_0$ is interchanged with $y_0$, where $a_i$ is defined by equation (83). This is expected from the geometry. Also, as discussed above, S is defined to be equal to $1/\sigma$ so as to reduce, or eliminate the chance of singularity.

The vector fields are then separated. Repeating some of the results from above, we have for the "vertical" vector field an ensemble of equations:

$$\{A_i = -y_A S_i + x_A\} \quad (90)$$

where:

$$\{A_i = -S_i y_i + x_i\} \quad (91)$$

and, $$\left\{S_i = \frac{\Delta x_i}{\Delta y_i}\right\} \quad (92)$$

Similarly, we have for the "horizontal" vector field, we have the following ensemble:

$$\{a_i = -x_a \sigma_i + y_a\} \quad (93)$$

with:

$$\{a_i \equiv -\sigma_i x_i + y_i\} \quad (94)$$

and $$\left\{\sigma_i = \frac{\Delta y_i}{\Delta x_i}\right\} \quad (95)$$

Note that equations (90) and (93) represent ensembles of points that lie close to straight lines which are defined by the parameters, $y_A$, $x_A$, for the vertical representation and, $x_a$, $y_a$, for the horizontal representation. In these equations, the characteristic lines have slopes $y_A$ and $x_a$, respectively.

Figures 13A, 13B, 13C:
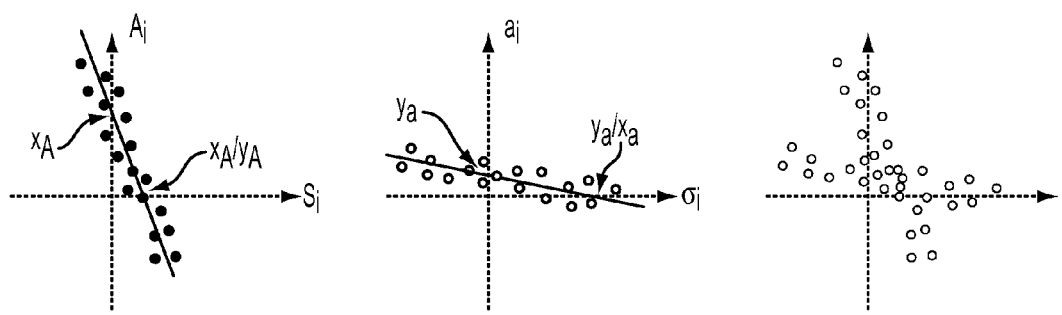
FIGS. 13a, 13b and 13c show plots of ensemble points in accordance with various aspects of the present disclosure.

If we were to plot the ensemble points, result as are shown in FIGS. 13a, 13b and 13c are obtained. As can be seen in FIGS. 13a, 13b and 13c, the points from each vector field usually will lie along separate straight lines. In most cases, with an overlay of these plots the two vector fields can readily be separated and their characteristic lines determined.

Figure 14:
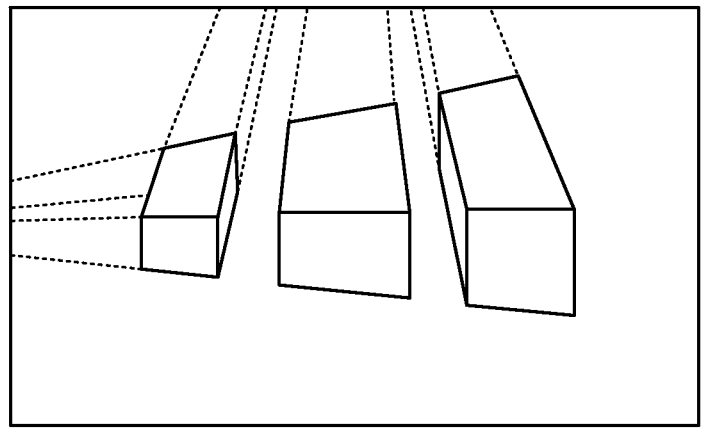
FIG. 14 shows an example of a distortion caused by moving the vanishing points in close proximity in accordance with various aspects of the present disclosure.
Figures 15A, 15B, 15C:
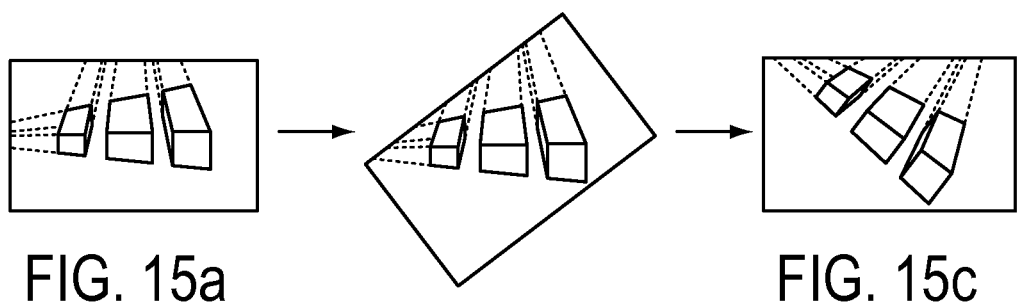
FIGS. 15a, 15b and 15c show an example whole image rotation by 45° in accordance with various aspects of the present disclosure.

In some cases where $x_A = y_a$ and $y_A = x_a$, the two ensembles will overlap and not be separable. Physically, this situation represents two vector fields which lie at right angles to each other and which have vanishing points that are the same radial distance from the center of the focal plane. Such a situation can occur in urban scenes where the urban grid extends to vanishing points on the horizon, as is shown in FIG. 14. In FIG. 14, substantial distortion is shown caused by pulling the vanishing points in close. This is done merely for illustration purposes only. In most views of this type, the vanishing points will be far distant and the perspective lines would be more nearly parallel. In this extreme case, the methodology outlined above would intermingle the linearized vector plots, as in FIGS. 13a, 13b and 13c, so that the vector fields would be impossible to disentangle. In these cases, the vector fields can be separated by taking advantage of the fact that the vector fields are at right angles. For example, the whole image, and not just the individual vectors, can be rotated by 45°, as is shown in FIG. 15.

Now, after the 45° rotation, the slopes of the vector fields do not have singularities and both fields can be described by the same formulas, such as equations (70) through (81), or, (82) through (59), but not both. In this common description, the Least Squares fitted control lines for the vector fields will be at right angles in a plot such as that of FIGS. 13a, 13b and 13c.

Once the two vanishing points have been determined, they may be rotated back, through 45°, to give the locations of the vanishing points in the original (unrotated) image.

In accordance with various aspects of the present disclosure, a method that uses observation of the horizon to derive key information needed to reconstruct a three dimensional model of the scene is disclosed. This method can be used with many types of cameras (and camera combinations) and many types of mounting platforms. One application of this method is in aerial survey—particularly aerial survey using a small Unmanned Aerial Vehicle (UAV). In the case of small UAV's, the payload capacity is often too small to accommodate a stable platform for the camera(s) and a high accuracy Inertial Navigation System (INS) to measure the position and pointing direction of the camera. In this circumstance, observation of the horizon provides the additional information needed for three dimensional reconstruction. Knowledge of the horizon may also be used to correct drift in the low quality Inertial Measurement Units (IMU's) which are becoming common even in very small (micro) UAV's.

In accordance with various aspects of the present disclosure, a process is disclosed using a set of equations which give the distance from the camera to any point in the scene, provided that certain conditions are met, such as the location of the horizon with respect to the camera center be known. In some aspects, the horizon line need not lie within the field of view of the camera; however, the tilt of the horizon line and the altitude of the camera above the local ground must be known if the resulting distance measurements are to be calibrated. If the altitude is not known, then it is still possible to reconstruct an unscaled model of the scene. Such unscaled modeling works best in a flat ground urban environment where the geometric relationships among the buildings are particularly simple. In some aspects, general scene reconstruction the availability of a terrain model is normally required. For general, calibrated, scene reconstruction it is useful for the Global Positioning System (GPS) coordinates of the camera to be available. Given an appropriate subset of the foregoing conditions, an estimate of the distance to any point in the scene can be determined by measuring that point's location in the image.

Figure 16:
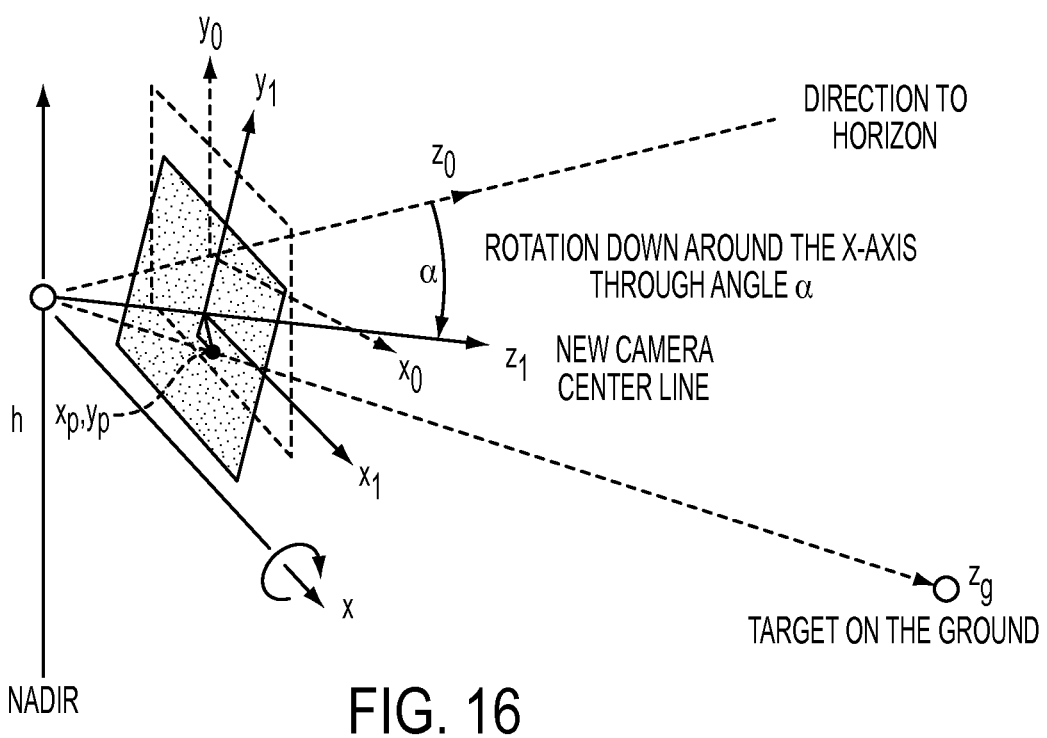
FIG. 16 shows an example geometry of the camera, where the camera is tilted down through an angle α in accordance with various aspects of the present disclosure.

The equations which govern the distance measurement uses the geometry, and definitions, illustrated in FIGS. 1 and 16. In FIG. 1, a standard, unrotated, camera position is shown with the camera pointed at the horizon, as discussed above. In FIG. 16, the camera tilted down through an angle $\alpha$ is shown. In FIG. 2, the x-axis of the camera's image plane is parallel to the horizon. In general, though, the camera is likely to be rotated around its center line through an angle $\phi$. The consequence of such a rotation is that the horizon will appear (counter) tilted at an angle $\phi$.

In both FIGS. 1, 2 and 16, $x_g$ and $z_g$ are the coordinates of a point in the ground plane. The parameter, h, is the height of the camera above the ground plane. $x_p$ and $y_p$ define the location of the ground point in the image. In the image, $x_p$ corresponds to $x_g$ and $y_p$ corresponds to $z_g$. The coordinate system used by the image, and these equations, has its origin in the center of the image. It is assumed that the image has been corrected for pincushion or barrel distortion so that it is rectilinear.

For application of the following equations, the rotation around the center line (through angle $\phi$) should be corrected so that the x-axis of the image is aligned with the horizon. For example, this can be done by appropriate measurement of the horizon line. In some aspects, once the tilt of the horizon line has been determined, the entire image can be rotated so that the image horizon is parallel to the true horizon. This can be done using various computational algorithms as would be apparent. In some aspects, the φ rotation angle is kept track of in all the subsequent calculations, such that the effect of the camera φ rotation can be analytically removed. This can also be done using various computational algorithms as would be apparent.

For an image where the image x-axis is parallel to the horizon, the following equations define the ground distance to each point in the image:

$$z_g = \frac{h(f\cos\alpha + y_p\sin\alpha)}{f\sin\alpha - y_p\cos\alpha} \quad (96)$$

and $$x_g = \frac{x_p(h\sin\alpha + z_g\cos\alpha)}{f} \quad (97)$$

The only new parameter in these equations is f, which denotes the focal length of the camera lens. Notice that the ground cross range value, $x_g$ depends on the $z_g$ ground location. This measure, in turn, depends on the $y_p$ location of the point in the image. If equation (96) is inserted into equation (97), the more general equation can be obtained for $x_g$:

$$x_g = \frac{hx_p}{f} \frac{(f(\sin^2\alpha + \cos\alpha)\sin\alpha + y_p\sin\alpha(1 - \cos\alpha))}{f\sin\alpha - y_p\cos\alpha} \quad (98)$$

Equation (98) shows that the estimated cross range ground position, $x_g$, of an object does depend on the $y_p$ position of that object in the image.

For points which are a distance Δh above the ground plane, equations (96) and (97) can be modified to the following form:

$$z_g = \frac{(h - \Delta h)(f\cos\alpha + y_p\sin\alpha)}{f\sin\alpha - y_p\cos\alpha} \quad (99)$$

and $$x_g = \frac{x_p((h - \Delta h)\sin\alpha + z_g\cos\alpha)}{f} \quad (100)$$

Equation (98) is easily modified, accordingly.

By way of a non-limiting example, such as a country scene, with undulating terrain, if a terrain contour map is not available to work with, Δh may not be determined. In this case, measurement of the distance to a point might be inaccurate. The contrary is often true in an urban environment. In this case, buildings are often (at least locally) on a relatively flat ground plane. Measurements may then be made, using equations (96), (97) or (98) to the ground plane base of a given structure. Once the distance to the base has been determined, the height of some point on the building, Δh, can then be determined by direct measurement from the image. The equation for the height is:

$$\Delta h = \frac{-(h\sin\alpha + z_g\cos\alpha)^2}{fz_g} \Delta y_p \quad (101)$$

An examination of the foregoing equations shows that many scenes can be effectively modeled, in three dimensions, provided the orientation of the camera with respect to the horizon is known. This camera orientation is given in terms of the angle of depression, α, of the camera with respect to the horizon, and the angle of rotation, φ, around the camera's center line.

In accordance with various aspects of the present disclosure, a separate camera, such as an infrared camera, can be used to determine the horizon line. For example, this separate camera can be an uncooled bolometer infrared camera, which is best suited to be the horizon camera. Such a camera can operate out to wavelengths on the order of 12 microns, which will typically penetrate through all but clouds and therefore is likely to provide a horizon image under most condition. Other suitable cameras can be used. With this information, and an appropriate camera-to-camera alignment scheme, the regular imaging camera can produce the information needed to make a scaled model of the scene it is imaging. This aspect is useful for photography from an aerial platform. Such a platform would normally fly above obstructions which obscure the horizon. An infrared horizon measuring camera can be selected to penetrate haze. Imaging in the infrared makes it more likely that the horizon will be seen under most environmental conditions.

Figure 17A:
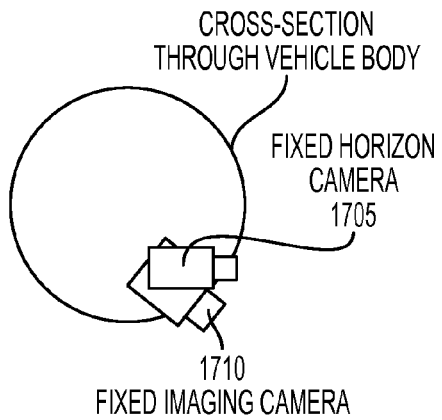
FIGS. 17a and 17b show an example camera arrangement including a principle imaging camera and horizon camera in accordance with various aspects of the present disclosure.

Two configurations are now discussed; however, other configurations can be used. In the first configuration as shown in FIG. 17*a*, wide field of view horizon camera 1705 can be mounted in a piggy-back relationship with principal imaging camera 1710. In this configuration, it is assumed that the two cameras are fixed fastened together in such a way that they move together. The coupled pair of cameras can be fix-mounted to the body of the vehicle, or the combination can be mounted in a gimbals set.

Figure 17B:
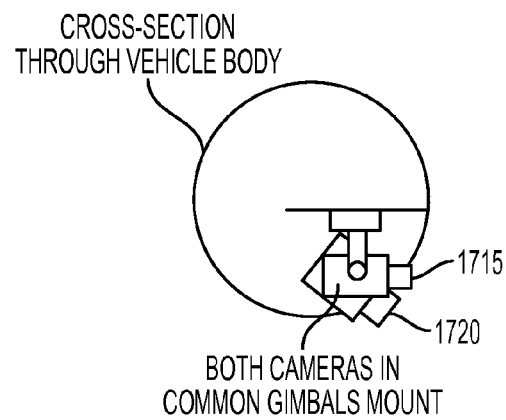
Figure 18:
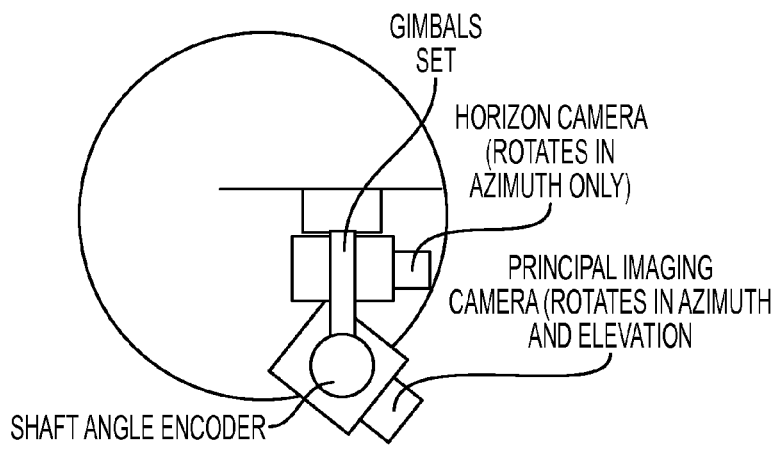
FIG. 18 shows another example camera arrangement in accordance with various aspects of the present disclosure.

In the second configuration as shown in FIG. 17*b*, wide field of view horizon camera 1715 and principal imaging camera 1720 can be mounted in a gimbals set 1725. In this second configuration, horizon camera 1715 can be mounted on the aircraft so that it is pointing essentially horizontally. Principal imaging camera 1720 can be mounted in gimbals in such a way that its depression angle can change with time and the camera can also rotate around a vertical axis. Horizon camera 1715 can be mounted on the outer gimbals in such a way that it pivots around a vertical axis together with principal imaging camera 1720 so that both cameras are pointed towards a common azimuth direction. In some aspects, horizon camera 1715 does not tilt down together with principal imaging camera 1720, but stays pointed towards the horizon, regardless of the depression angle of principal imaging camera 1720. An angle transfer mechanism, such as a shaft angle encoder, measures the relative angle between the two cameras so that the location of the horizon line can be compared (analytically) with the image in the principal imaging camera, as shown in FIG. 18.

Since the lenses of most cameras produce some kind of distortion, such as pincushion or barrel distortion, this distortion can be corrected to more accurately measure and model the scene. Such correction can be done digitally, through remapping the digital images. This will require a spatial calibration procedure either before, or after, the images have been taken. Moreover, the horizon camera should have a wide enough field of view that it can successfully capture a substantial region of the horizon, regardless of any roll, pitch or yaw of the vehicle during the image capture period.

In accordance with various aspects of the present disclosure, a computer-implemented method is disclosed for deriving vanishing points, and major perspective lines, for a scene. This method relies on extracting a multitude of local vectors from the scene. This multitude defines a vector field (or even multiple, overlapping, vector fields) relating to the perspective geometry. Information about the location of the vanishing points is determined using this vector field approach because it relies on information drawn automatically from all over the image, rather than just from a few selected lines. This method uses the understanding about how information in an image is organized. For example, many images may be decomposed into small elemental vectors which converge to a vanishing point and which can be defined as a field of vectors. In most images, there will actually be multiple fields of vectors with each field converging toward a different vanishing point. The vanishing points which are associated with these fields may be located anywhere with respect to the depicted scene. They may even lie well outside the frame of the image. For example, if the image depicts a scene generally looking towards a horizon, then the nadir or zenith vanishing points will assuredly lie well outside the image. Many images of rectilinear buildings have their edges converging to vanishing points on the horizon which may, or may not lie within the frame of the image. The method is capable of locating these vanishing points regardless of whether, or not, these vanishing points lie within the frame of the image.

Figure 19:
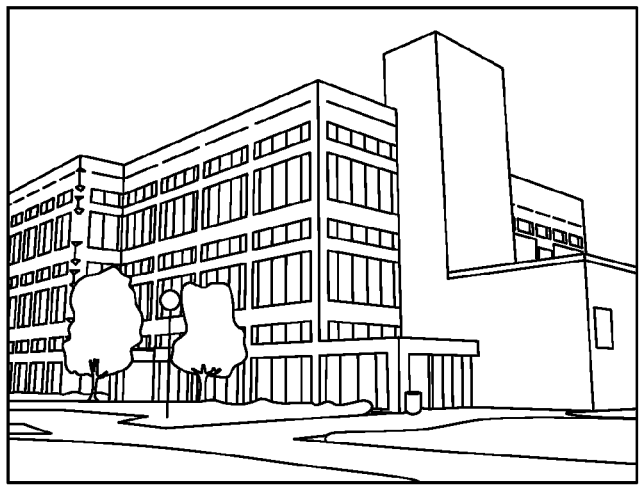
FIG. 19 shows an illustrative image, where the building in this image has particularly strong perspective information in accordance with various aspects of the present disclosure.

FIG. 19 shown an illustrative image, where the building in this image has particularly strong perspective information. There are three vanishing points associated with the structure—left and right vanishing points, both located on the (invisible) horizon, and a vertical vanishing point. The vertical vanishing point is at the zenith because we are looking generally up at the building rather than down. Note that each of the vanishing points are at the convergences of multiple lines in the image. Note also that all three vanishing points lie outside the frame of the image. Finally, note that, because there are multiple vanishing points, there are a corresponding number of types of image features—in this case, three. Each of these types of features form a vector field. These fields of features are primarily composed of vectors which define the directions of the edges in the image. In many areas these vector fields overlap. For example, the vertical feature vector fields overlap with the horizontal feature vector fields. Another characteristic of these vector fields is that they appear to radiate from their corresponding vanishing points. This apparent radiation is an inherent property of the mathematics of perspective geometry which describes the scene.

In the method, a scene, such as that illustrated by FIG. 19, is analyzed to extract the edge vectors from the scene, sort these edge vectors into distinguishable radial fields of vectors and then find the vanishing points that correspond to each of the fields of vectors. From the relative image locations of these vanishing points, information about the three dimensional characteristics of the scene can be derived.

Figure 20:
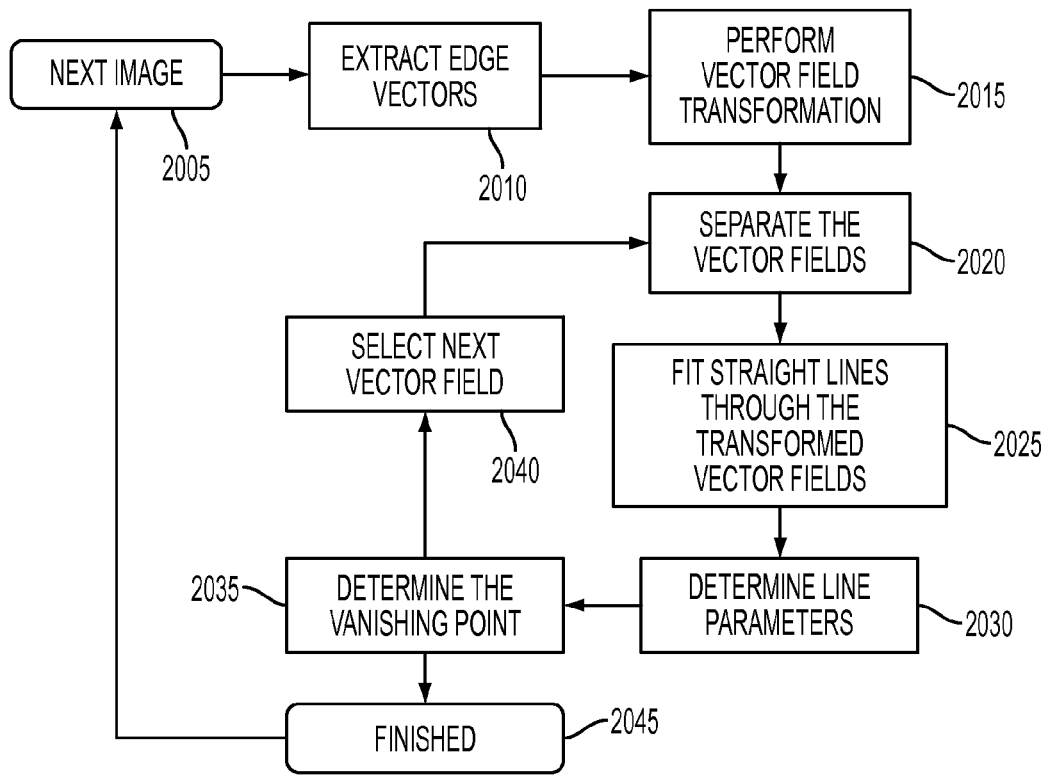
FIG. 20 shows an example process flow in accordance with various aspects of the present disclosure.
Figure 21A:
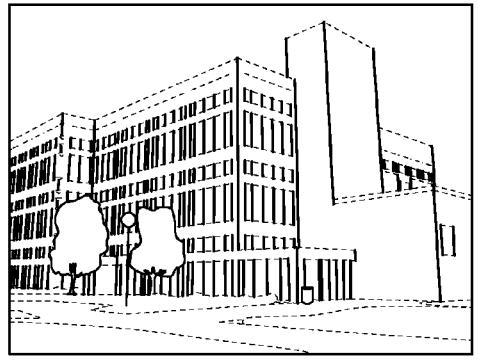
FIGS. 21a and 21b show an example of extracting edge vectors of FIG. 20.
Figure 21B:
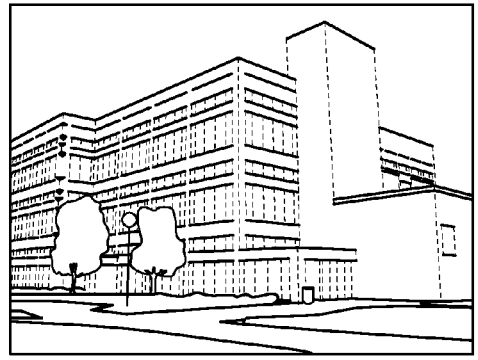

FIG. 20 shows a process flow in accordance with various aspects of the present disclosure. At 2005, each new image will undergo feature extraction and analysis. The first analytical stage of this process is to extract, at 2010, vectors which represent the linear edge features in the image (as many edge features as possible). Such linear features might be the vertical edges of buildings, windows, etc. Or, they might be horizontal features such as the tops and bottoms of windows, roof lines, base lines of buildings, street curbs or side walks, etc. There are several methods for defining vectors which lie parallel to these edges. The Sobel operator is one such. The Canny edge detector is another. FIGS. 21a and 21b show the first stage in the extraction of these edge vectors.

The next stage is to perform a Radial Vector Field transformation, at 2015, of these vectors. The specifics of this transformation are discussed above. The net effect of this transformation is to convert each edge vector into a single point in the transform space, such that the transformed points from all the edge vectors in a given vector field line up in such a way as to define the image vanishing point for that particular vector field. If there are multiple vanishing points, then there will be a corresponding multiple number of lines in the transform space.

Figure 22:
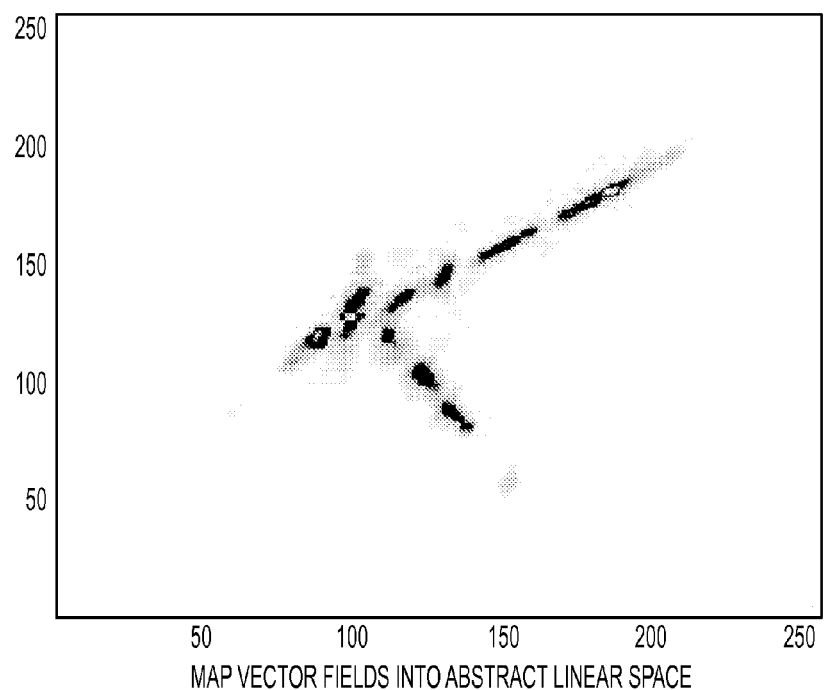
FIG. 22 shows an example vector fields map abstracted into linear space of the separated vector fields of the process of FIG. 20.
Figure 23:
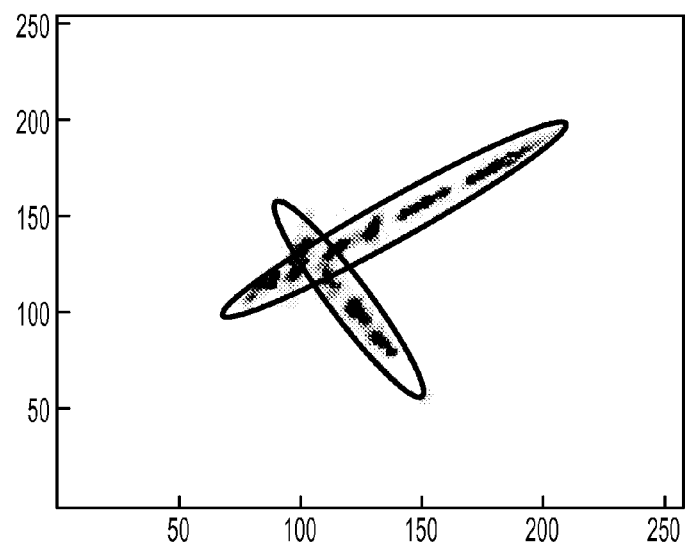
FIG. 23 shows an example plot of the separation of two vector field clouds of the process of FIG. 20.

These multiple lines are separated at 2020. The result will be distinguishable "clouds" of points, with each cloud representing a particular vanishing point. The clouds for the horizontal vector fields of FIGS. 19, 21a and 21b are shown in FIG. 22. One method of separating the points which belong to different vanishing point clouds is using RANSAC (RANdom SAmple Consensus) method as would be apparent. Separation of two vector field clouds is illustrated in FIG. 23. Note that there is ambiguity where the clouds cross. These intersection points may be excluded from further analysis.

Figure 24A:
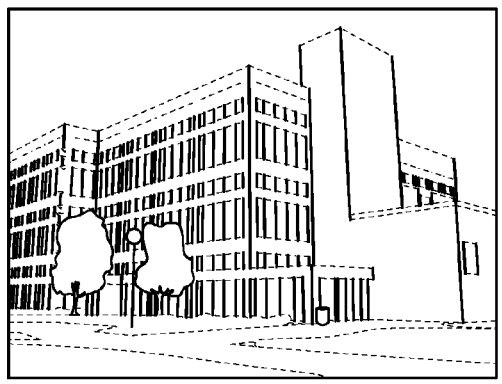
FIGS. 24a and 24b show an example fitting for the vertical edge vector field of the process of FIG. 20.
Figure 24B:
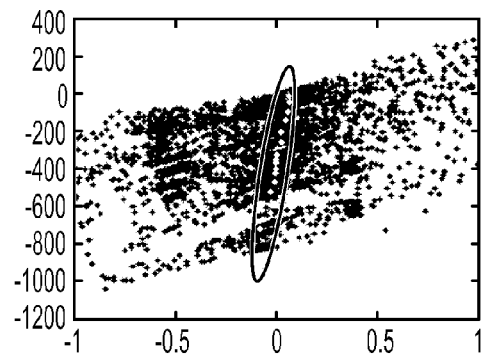

If the computational process were perfect, then the points of each cloud would fall along a single straight line. In practice, however, the edge extraction process is not perfect, as FIGS. 23, 24a and 24b show. There may be several sources which create imperfections. The most prominent are random noise and image undersampling, or aliasing. Thus, once the clouds for different vector fields have been separated some method of representing these clouds as straight lines must be used. One method is to Least Squares Fit (LSF) a straight line through each separated ensemble of points. This is done at 2025 of FIG. 20. FIGS. 24a and 24b illustrate this fitting for the vertical edge vector field.

Figure 25A:
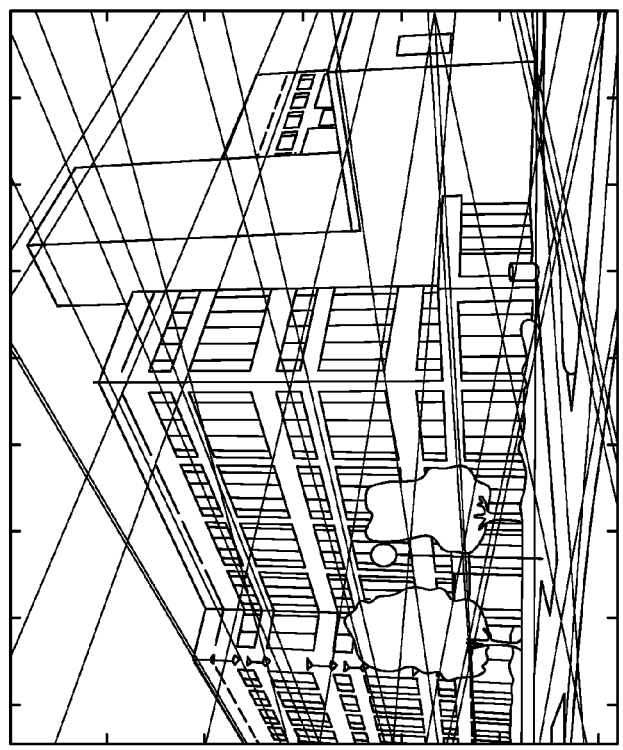
FIGS. 25a and 25b show an example conversion of the line parameters into the coordinates of the corresponding vanishing point in the original image space from the peak values along the ridges of FIGS. 23, 24a and 24b.
Figure 25B:
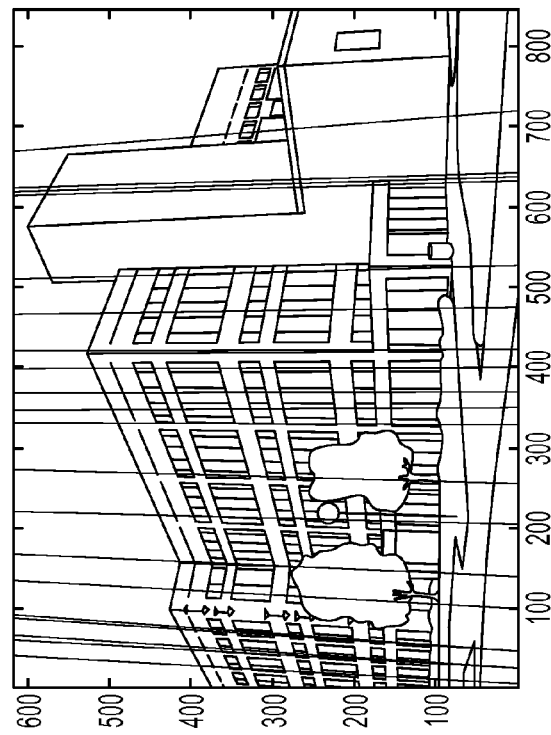

The parameters of each of these lines is extracted at 2030, for example by using the LSF method at 2025. At 2035, the line parameters are converted into the coordinates of the corresponding vanishing point in the original image space. Typical lines radiating from these computed vanishing points are shown in FIGS. 25a and 25b. The lines in FIGS. 25a and 25b were computed from the peak values along the ridges in FIGS. 23, 24a and 24b.

The process is iterated at 2040 until each line cloud has been separated, line fitted and converted into a corresponding vanishing point. When all the vanishing points have been extracted, the analysis of this particular image is finished, at 2045, and another image may then be selected for analysis.

Figure 26:
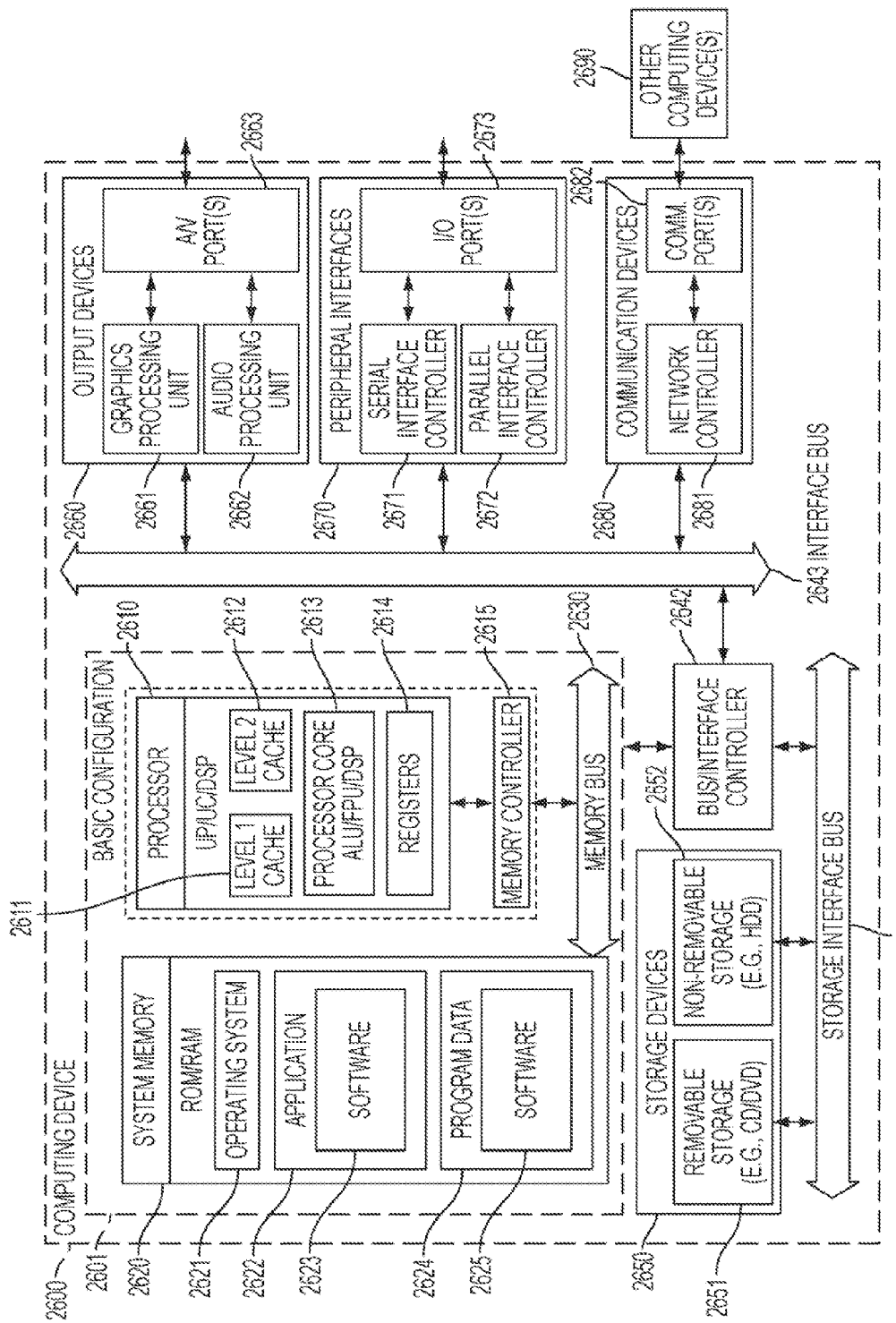
FIG. 26 is a block diagram illustrating an example computing device that is arranged to perform the various processes and/or methods in accordance with the various aspects of the present disclosure.

FIG. 26 is a block diagram illustrating an example computing device 2600 that is arranged to perform the various processes and/or methods in accordance with the various aspects of the present disclosure. In a very basic configuration 2601, computing device 2600 typically includes one or more processors 2610 and a system memory 2620. A memory bus 2630 may be used for communicating between processor 2610 and system memory 2620.

Depending on the desired configuration, processor 2610 may be of any type including but not limited to a microprocessor (µP), a microcontroller (µC), a digital signal processor (DSP), or any combination thereof. Processor 2610 may include one more levels of caching, such as a level one cache 2611 and a level two cache 2612, a processor core 2613, and registers 2614. An example processor core 2613 may include an arithmetic logic unit (ALU), a floating point unit (FPU), a digital signal processing core (DSP Core), or any combination thereof. An example memory controller 2615 may also be used with processor 2610, or in some implementations memory controller 2615 may be an internal part of processor 2610.

Depending on the desired configuration, system memory 2620 may be of any type including but not limited to volatile memory (such as RAM), non-volatile memory (such as ROM, flash memory, etc.) or any combination thereof. System memory 2620 may include an operating system 2621, one or more applications 2622, and program data 2624. Application 2622 may include one or more of the various algorithms, processes or methods discussed above 2623 that is arranged to perform the functions as described with respect to processes of FIGS. 1-25. Program data 2624 may include data 2625 that may be useful for one or more of the various algorithms, methods or processes as is described herein. In some embodiments, application 2622 may be arranged to operate with program data 2624 on operating system 2621 such that implementations of the various algorithms, processes or methods may be provided as described herein. This described basic configuration 2601 is illustrated in FIG. 26 by those components within the inner dashed line.

Computing device 2600 may have additional features or functionality, and additional interfaces to facilitate communications between basic configuration 2601 and any required devices and interfaces. For example, a bus/interface controller 2642 may be used to facilitate communications between basic configuration 2601 and one or more data storage devices 2650 via a storage interface bus 2641. Data storage devices 2650 may be removable storage devices 2651, non-removable storage devices 2652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 2620, removable storage devices 2651 and non-removable storage devices 2652 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 2600. Any such computer storage media may be part of computing device 2600.

Computing device 2600 may also include an interface bus 2643 for facilitating communication from various interface devices (e.g., output devices 2660, peripheral interfaces 2670, and communication devices 2680) to basic configuration 2601 via bus/interface controller 2642. Example output devices 2660 include a graphics processing unit 2661 and an audio processing unit 2662, which may be configured to communicate to various external devices such as a display or speakers via one or more A/V ports 2663. Example peripheral interfaces 2670 include a serial interface controller 2671 or a parallel interface controller 2672, which may be configured to communicate with external devices such as input devices (e.g., keyboard, mouse, pen, voice input device, touch input device, etc.) or other peripheral devices (e.g., printer, scanner, etc.) via one or more I/O ports 2673. An example communication device 2680 includes a network controller 2681, which may be arranged to facilitate communications with one or more other computing devices 2690 over a network communication link via one or more communication ports 2682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both physical storage media and communication media.

Computing device 2600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 2600 may also be implemented as a personal computer including both laptop computer and non-laptop computer configurations.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. A method for constructing a three-dimensional model of a scene captured as a video stream, comprising:
    obtaining a video stream of a scene by a first camera;
    locating a horizon with respect to the scene with a second camera, wherein the horizon is located as a function of a downward tilt angle of the first camera and a roll angle about a line of sight of the first camera; and
    in a processor in communication with a memory having instructions stored therein which, when executed, constructing a three-dimensional model of the scene based upon the obtained video stream and the located horizon.

2. The method according to claim 1, wherein the second camera includes an infrared sensor that is configured to penetrate haze and other obscurants.

3. The method according to claim 1, further comprising:
    co-mounting the first and the second camera on a common support structure.

4. The method according to claim 1, wherein the second camera is configured to image an area outside of a field of view of the first camera.

5. The method according to claim 1, further comprising:
    finding a range to an object within the scene by measuring an image position of the object with respect to the located horizon.

6. The method according to claim 1, further comprising:
    determining a vanishing point in a nadir direction.

7. The method according to claim 6, further comprising:
    correlating a vertical edge within the scene with a motion derived nadir vanishing point to refine an estimated camera pose.

8. The method according to claim 6, wherein the vanishing point in the nadir direction is determined based on the downward tilt angle of the first camera and the roll angle about a line of sight of the first camera.

9. The method according to claim 8, further comprising:
    measuring slopes, locations and divergences of vertical edges within the video stream of the scene to determine the downward tilt angle of the first camera, the roll angle about the line of sight of the first camera, and the scene horizon.

10. The method according to claim 9, further comprising:
determining a distance to an object within the scene on a ground plane at a known relative altitude based on a focal length of the first camera and the scene horizon, the downward tilt angle of the first camera, and the roll angle about a line of sight of the first camera.

11. The method according to claim 10, further comprising:
determining different range features of other objects within the scene based on the determined distance to the object.

12. The method according to claim 11, further comprising:
determining a physical height of the object based on a height of the image of the object and the downward tilt angle of the first camera.

13. A computer-implemented method for determining a distance from a camera mounted to an aerial vehicle and locations within an image captured by the camera in a processor in communication with a memory having instructions stored therein which, when executed, perform the method comprising:

determining a location of a horizon with respect to a center of the camera, wherein the horizon location is determined as a function of a downward tilt angle of the camera and a roll angle about a center line of the camera and wherein the camera includes a lens with a focal length, the camera arranged at a height above a ground plane and at the downward tilt angle;

determining a horizon line based on the determined location of the horizon;

determining a tilt of the horizon line;

determining a location of a ground point in the image; and determining, by a distance determining computer, the distance from the height of the camera, the focal length of the lens of the camera, the downward tilt angle and the location of the ground point in the image.

14. The computer-implemented method according to claim 13, wherein the horizon line is outside a field of view of the camera.

* * * * *

UNITED STATES PATENT AND TRADEMARK OFFICE
CERTIFICATE OF CORRECTION

PATENT NO. : 8,610,708 B2
APPLICATION NO. : 12/888166
DATED : December 17, 2013
INVENTOR(S) : Chet L. Richards It is certified that error appears in the above-identified patent and that said Letters Patent is hereby corrected as shown below:

On the title page, in column 2, Item (56) under "Other Publications", line 1, before "European", insert --"--, therefor On the title page, in column 2, Item (56) under "Other Publications", line 2, after "2012", insert --"--, therefor On the title page, in column 2, Item (56) under "Other Publications", line 3, before "European", insert --"--, therefor On the title page, in column 2, Item (56) under "Other Publications", line 4, after "2012", insert --"--, therefor On the title page, in column 2, Item (56) under "Other Publications", line 5, before "European", insert --"--, therefor On the title page, in column 2, Item (56) under "Other Publications", line 6, after "2012", insert --"--, therefor On the title page, in column 2, Item (56) under "Other Publications", line 7, delete "A," and insert --A.,--, therefor On the title page, in column 2, Item (56) under "Other Publications", line 26, before "European", insert --"--, therefor On the title page, in column 2, Item (56) under "Other Publications", line 27, after "2012", insert --"--, therefor Signed and Sealed this
Twenty-fifth Day of November, 2014

Michelle K. Lee
*Deputy Director of the United States Patent and Trademark Office*

CERTIFICATE OF CORRECTION (continued)
U.S. Pat. No. 8,610,708 B2

In the Drawings

Sheet 11 of 16, Fig. 18, line 3, after "ELEVATION", insert --)--, therefor

In the Specification

In column 1, line 32, before "newly", delete "then", therefor

In column 7, line 34, delete "$y_h$" and insert --$y_g$--, therefor

In column 7, line 57, before "any", delete "of", therefor

In column 9, line 22, delete "$y_h$" and insert --$y_p$--, therefor

In column 11, line 3, after "(12)", insert --:--, therefor

In column 13, line 23, after "from", insert --:--, therefor

In column 15, line 22, delete "a:" and insert --σ:--, therefor

In column 15, line 22, delete "Δy" and insert --Δx--, therefor

In column 16, line 38 (Approx.), delete "$A_i = x_i - S_i y_i$" and insert --$A_i \equiv x_i - S_i y_i$--, therefor In column 24, line 54, after "one", insert --or--, therefor